US012699859B2

(12) United States Patent
Crestani et al.

(10) Patent No.: US 12,699,859 B2
(45) Date of Patent: Aug. 4, 2026

(54) APPARATUS AND METHOD FOR ENABLING USE OF SCAN PIPELINE TO CAPTURE AND DECODE ENCODED DATA MARKINGS

(71) Applicant: Datalogic IP Tech S.R.L., Calderara di Reno (IT)

(72) Inventors: Giulio Crestani, Argenta (IT); Marco Donato Torsello, Savignano sul Panaro (IT); Nicholas Brunetto, Castenaso (IT); Lamberto Leoncavallo, Bologna (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 0 days.

(21) Appl. No.: 18/914,377

(22) Filed: Oct. 14, 2024

(65) Prior Publication Data

US 2026/0105271 A1    Apr. 16, 2026

(51) Int. Cl.
*G06K 7/14* (2006.01)
*H04N 23/80* (2023.01)

(52) U.S. Cl.
CPC ......... *G06K 7/1413* (2013.01); *G06K 7/1443* (2013.01); *H04N 23/80* (2023.01)

(58) Field of Classification Search
CPC ...... G06K 7/1413; G06K 7/14; G06K 7/1443; G06K 7/1417; G06K 7/1401; H04N 23/80
USPC .................... 235/462.01, 454, 439, 435, 375
See application file for complete search history.

(56) References Cited

U.S. PATENT DOCUMENTS

2014/0320698 A1* 10/2014 Karivaradaswamy .......................
H04N 5/772
348/231.99
2019/0087198 A1* 3/2019 Frascati ................... H04N 9/79
2021/0073108 A1   3/2021 Wang

* cited by examiner

*Primary Examiner* — Edwyn Labaze
(74) *Attorney, Agent, or Firm* — The Juhasz Law Firm

(57) ABSTRACT

A method includes, in executing at least one routine of a scan engine pipeline, decoding an encoded data marking within a scan image captured by a scan engine to retrieve data encoded in the encoded data marking, encoding the data in at least one new encoded data marking within at least one generated image, and providing the at least one generated image to a camera pipeline through a camera driver interface to a camera pipeline; in executing at least one routine of the camera pipeline, relaying the at least one generated image to a camera scan application through a camera API; and in executing the camera scan application, decoding the at least one new encoded data marking within the at least one generated image to retrieve the first data.

20 Claims, 17 Drawing Sheets

Figure 7B:
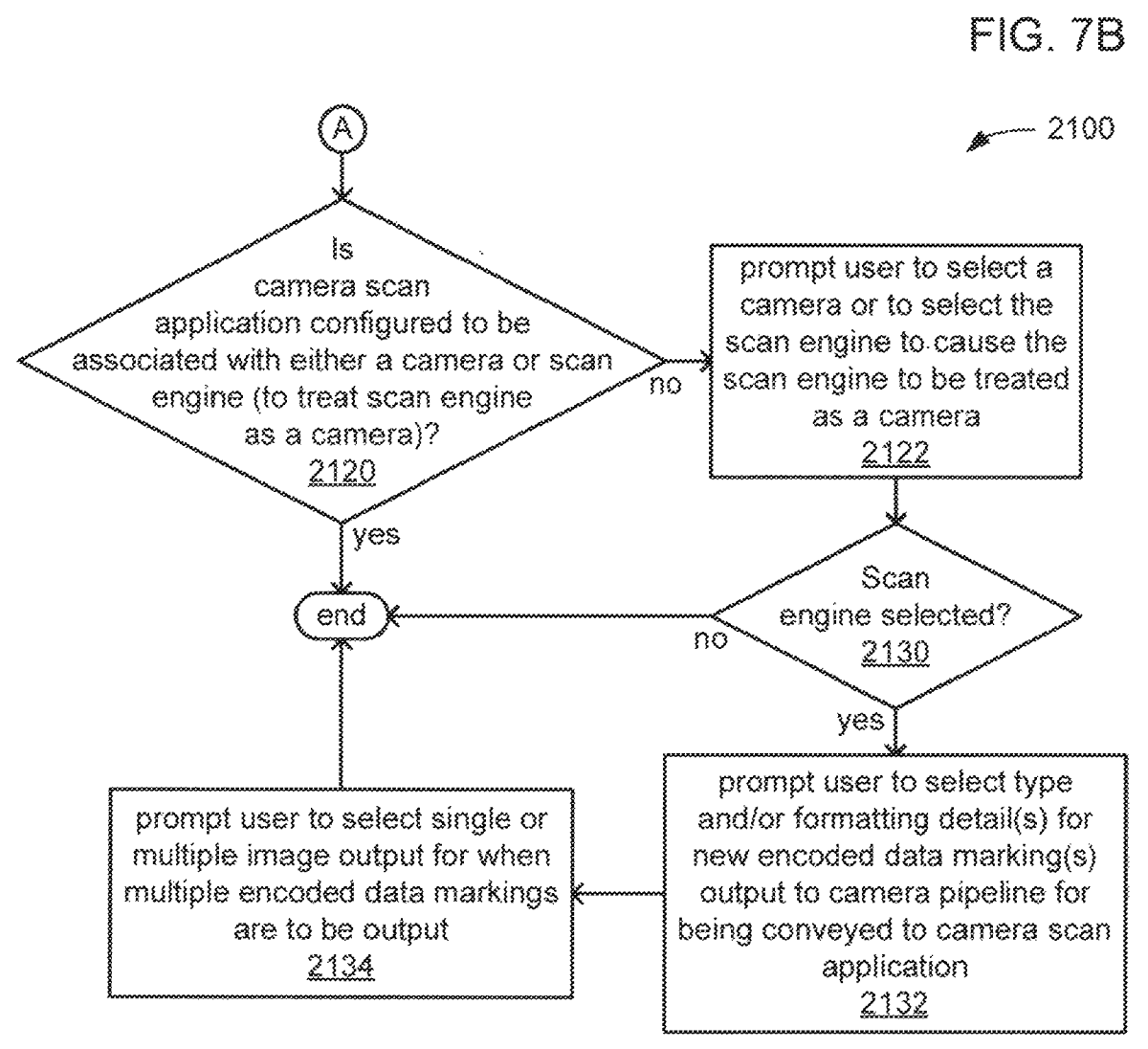

Is camera scan application configured to be associated with either a camera or scan engine (to treat scan engine as a camera)? 2120 no → prompt user to select a camera or to select the scan engine to cause the scan engine to be treated as a camera 2122 yes → end

Scan engine selected? 2130 no → end yes → prompt user to select type and/or formatting detail(s) for new encoded data marking(s) output to camera pipeline for being conveyed to camera scan application 2132 prompt user to select single or multiple image output for when multiple encoded data markings are to be output 2134

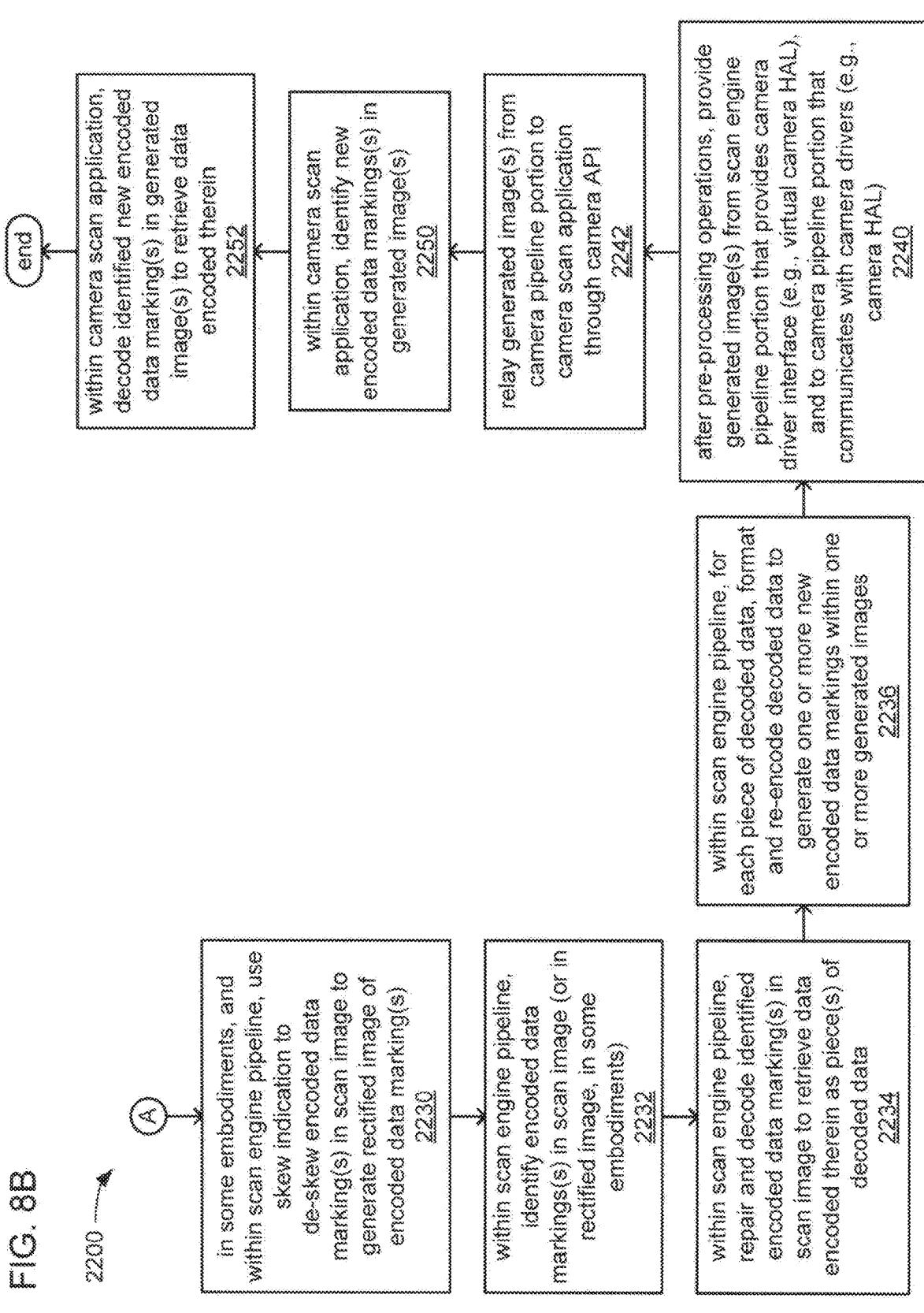

A in some embodiments, and within scan engine pipeline, use skew indication to de-skew encoded data marking(s) in scan image to generate rectified image of encoded data marking(s) 2230 within scan engine pipeline, identify encoded data markings(s) in scan image (or in rectified image, in some embodiments) 2232 within scan engine pipeline, repair and decode identified encoded data marking(s) in scan image to retrieve data encoded therein as piece(s) of decoded data 2234 within scan engine pipeline, for each piece of decoded data, format and re-encode decoded data to generate one or more new encoded data markings within one or more generated images 2236 after pre-processing operations, provide generated image(s) from scan engine pipeline portion to camera pipeline portion that provides camera driver interface (e.g., virtual camera HAL), and to camera pipeline portion that communicates with camera drivers (e.g., camera HAL) 2240 relay generated image(s) from camera pipeline portion to camera scan application through camera API 2242 within camera scan application, identify new encoded data markings(s) in generated image(s) 2250 within camera scan application, decode identified new encoded data marking(s) in generated image(s) to retrieve data encoded therein 2252 end

APPARATUS AND METHOD FOR ENABLING USE OF SCAN PIPELINE TO CAPTURE AND DECODE ENCODED DATA MARKINGS

BACKGROUND

1. Technical Field

The present disclosure relates to increasing efficiency and ease of use of machine vision systems.

2. Description of the Related Art

The application of encoded data markings that encode data (e.g., indicia such as barcodes, digital watermarks and/or human-readable text) to a surface of an object for subsequent capture and decoding to retrieve data encoded therein is well known. Also well known is the use of a scanning device incorporating a scan engine to directly capture an image of such a surface in an effort to capture an image of one or more encoded data markings thereon for decoding. Further well known is the use of such markings, together with such capturing and decoding thereof, in organizing such activities as the transport, storage and inventorying of objects in various industries.

Such a scanning device may be a portable scanning device maintained at a location at which an object bearing one or more of such encoded data markings may be manufactured, at which such an object may be stored, through which such an object may be transported, and/or at which such an object may be offered for sale. By way of example, such a scanning device may be carried by personnel at a warehouse to enable the capture of one or more encoded data markings carried on a surface of an object (e.g., a box, a crate, a palletized load, etc.) as the object is transported into the warehouse, is stored within the warehouse, is retrieved from such storage and/or is transported out of the warehouse. Also by way of example, such a scanning device may be carried by personnel at a store, a performance venue or other place of business to enable the capture of one or more encoded data markings carried on a surface of an object as the object is transported thereto or therefrom, and/or is presented as part of an admission procedure (e.g., a package of a product that is being purchased thereat, a package that is being delivered or is being picked up by a courier, a ticket that is being presented for admission to attend an event thereat, a ticket that is being presented to board transportation to another location, etc.).

In the design and manufacture of scanning devices, it has become commonplace to make use of the many ongoing technological improvements in the hardware and software components of such portable electronic devices as tablet computers and smartphones. Thus, it has become commonplace to use the Android operating system promulgated largely by Google LLC of Mountain View, CA, USA for use in portable electronic devices. The Android operating system is based largely on the Linux operating system, which was, and continues to be, developed as a collaborative effort among numerous individuals and corporations. In the Android operating system, as in many operating systems, one or more pipelines may be defined by combinations of particular hardware and software components to perform particular relatively complex functions. Such pipelines tend to include a display pipeline for the generation and presentation of visual images on a display, and/or a camera pipeline for the capture and storage of imagery captured by a camera.

Within each such pipeline, one or more software components usually serve to provide an application programming interface (API) through which one or more application routines are able to interact indirectly with the hardware components thereof.

Within scanning devices, there may also be a combination of more specialized hardware and software components that define a scan pipeline for the capture and decoding of encoded data markings. Such specialized hardware components may include image capture hardware incorporating features not found in typical cameras to overcome various difficulties in capturing clear images of encoded data markings. Such specialized software components may include routines not found in typical camera pipelines to overcome various difficulties in the quality of such captured images, in identifying encoded data markings within such captured images, and/or in decoding such identified encoded data markings. As with other pipelines, there may be one or more software components that serve to provide an applications programming interface (API) through which application routines are able to interact indirectly with the hardware components thereof.

Such more specialized hardware and software components of a scan pipeline have consistently proven to be more capable of overcoming a number of difficulties that are often encountered in capturing, identifying and decoding encoded data markings. However, the higher costs associated with including such components in scanning devices, coupled with ongoing improvements in the more conventional cameras often incorporated into portable electronic devices, has repeatedly lead to efforts to attempt to use such conventional cameras within conventional camera pipelines to perform such capturing, identification and decoding with encoded data markings. Since conventional camera pipelines do not typically include software components that support the identification and decoding of encoded data markings, such functions may be performed within a camera scan application that has been specifically written to incorporate those functions.

As a result of such efforts to make such use of convention cameras and conventional camera pipelines, many users of portable electronic devices have had the disappointing experience of initially believing that the specialized hardware and software components of a scan pipeline are unnecessary to achieve good results, only to discover that this is not true under many circumstances. However, by the time such users have developed the understanding of the usefulness of such specialized hardware and software, they are often already familiar and habituated with using a camera scan application that was intended to work with a more conventional camera through a typical camera pipeline, and do not wish to go through the effort of learning to use a different scan engine application that was written to work with a scan pipeline. Thus, even though using such a less capable camera scan application actually hinders achieving better results in capturing, identifying and decoding encoded data markings, some of such users actually choose to continue doing so. An approach to allowing such users to use such a less capable camera scan application with the more specialized hardware and software components of a scanning pipe is required.

BRIEF SUMMARY

Technologies are described for enabling the use of a hardware and software components of a scan pipeline with a camera scan application that is not intended to work with such a pipeline.

A decoding device includes a scan engine configured to capture a scan image of a first encoded data marking, wherein the scan engine is associated with a scan engine pipeline; and storage configured to store at least one of the scan image, a camera scan application configured to use a camera through a camera applications programming interface (API) to capture a camera image, at least one executable routine of a camera pipeline, and at least one executable routine of the scan engine pipeline. The decoding device also includes a processor communicatively coupled to the storage and to the scan engine, the processor configured to perform operations including: in executing instructions of the at least one executable routine of the scan engine pipeline, perform pre-processing operations including decode the first encoded data marking within the scan image to retrieve first data encoded in the first encoded data marking, and encode the first data in at least one new encoded data marking within at least one generated image; in executing instructions of the at least one executable routine of the scan engine pipeline, provide the at least one generated image to the at least one executable routine of the camera pipeline through a first camera driver interface of a first link formed between the scan engine pipeline and the camera pipeline, wherein characteristics of the first camera driver interface mimic characteristics of a second camera driver interface of a camera driver; in executing instructions of the at least one executable routine of the camera pipeline, relay the at least one generated image to the camera scan application through the camera API; and in executing instructions of the camera scan application, decode the at least one new encoded data marking within the at least one generated image to retrieve the first data.

A method includes, in executing, by a processor of a decoding device, instructions of at least one executable routine of a scan engine pipeline of the decoding device, performing pre-processing operations including: decoding, by the processor, a first encoded data marking within a scan image captured by a scan engine of the decoding device to retrieve first data encoded in the first encoded data marking; and encoding, by the processor, the first data in at least one new encoded data marking within at least one generated image. The method further includes: in executing, by the processor, instructions of the at least one executable routine of the scan engine pipeline, providing the at least one generated image to at least one executable routine of a camera pipeline of the decoding device through a first camera driver interface of a first link formed between the scan engine pipeline and the camera pipeline, wherein characteristics of the first camera driver interface mimic characteristics of a second camera driver interface of a camera driver; in executing, by the processor, instructions of at least one executable routine of the camera pipeline, relaying the at least one generated image to a camera scan application of the decoding device through a camera applications programming interface (API), wherein the camera scan application is configured to use a camera through the camera API; and in executing, by the processor, instructions of the camera scan application, decoding the at least one new encoded data marking within the at least one generated image to retrieve the first data.

BRIEF DESCRIPTION OF THE DRAWINGS

FIGS. 7A and 7B, together, provide a flowchart of configuring a scan engine pipeline to cooperate with a camera pipeline within the architecture of FIGS. 3A-B to use a scan engine as if it is a more conventional camera.

FIGS. 8A and 8B, together, provide a flowchart of operation of a scan pipeline with a camera scan application in the internal architecture of FIGS. 3A-B.

DETAILED DESCRIPTION

Figure 1A:
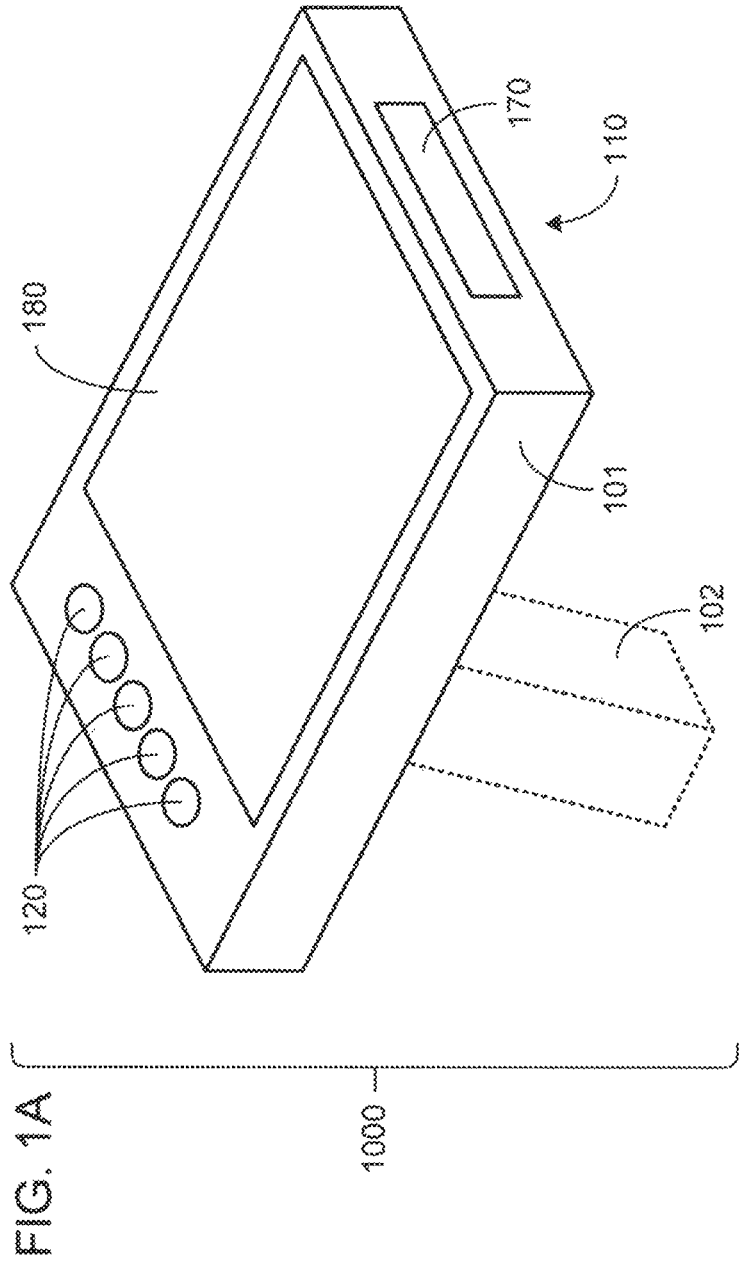
FIGS. 1A and 1B, together, provide perspective views of a portable scanning device capable of scanning, identifying and decoding encoded data markings.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a decoding system in which hardware and software components of a scan pipeline are caused to work with a camera scan application that is not intended to work with such a pipeline.

A decoding device includes a scan engine configured to capture a scan image of a first encoded data marking, wherein the scan engine is associated with a scan engine pipeline; and storage configured to store at least one of the scan image, a camera scan application configured to use a camera through a camera applications programming interface (API) to capture a camera image, at least one executable routine of a camera pipeline, and at least one executable routine of the scan engine pipeline. The decoding device also includes a processor communicatively coupled to the storage and to the scan engine, the processor configured to perform operations including: in executing instructions of the at least one executable routine of the scan engine pipeline, perform pre-processing operations including decode the first encoded data marking within the scan image to retrieve first data encoded in the first encoded data marking, and encode the first data in at least one new encoded data marking within at least one generated image;

in executing instructions of the at least one executable routine of the scan engine pipeline, provide the at least one generated image to the at least one executable routine of the camera pipeline through a first camera driver interface of a first link formed between the scan engine pipeline and the camera pipeline, wherein characteristics of the first camera driver interface mimic characteristics of a second camera driver interface of a camera driver; in executing instructions of the at least one executable routine of the camera pipeline, relay the at least one generated image to the camera scan application through the camera API; and in executing instructions of the camera scan application, decode the at least one new encoded data marking within the at least one generated image to retrieve the first data.

A method includes, in executing, by a processor of a decoding device, instructions of at least one executable routine of a scan engine pipeline of the decoding device, performing pre-processing operations including: decoding, by the processor, a first encoded data marking within a scan image captured by a scan engine of the decoding device to retrieve first data encoded in the first encoded data marking; and encoding, by the processor, the first data in at least one new encoded data marking within at least one generated image. The method further includes: in executing, by the processor, instructions of the at least one executable routine of the scan engine pipeline, providing the at least one generated image to at least one executable routine of a camera pipeline of the decoding device through a first camera driver interface of a first link formed between the scan engine pipeline and the camera pipeline, wherein characteristics of the first camera driver interface mimic characteristics of a second camera driver interface of a camera driver; in executing, by the processor, instructions of at least one executable routine of the camera pipeline, relaying the at least one generated image to a camera scan application of the decoding device through a camera applications programming interface (API), wherein the camera scan application is configured to use a camera through the camera API; and in executing, by the processor, instructions of the camera scan application, decoding the at least one new encoded data marking within the at least one generated image to retrieve the first data.

Figure 1B:
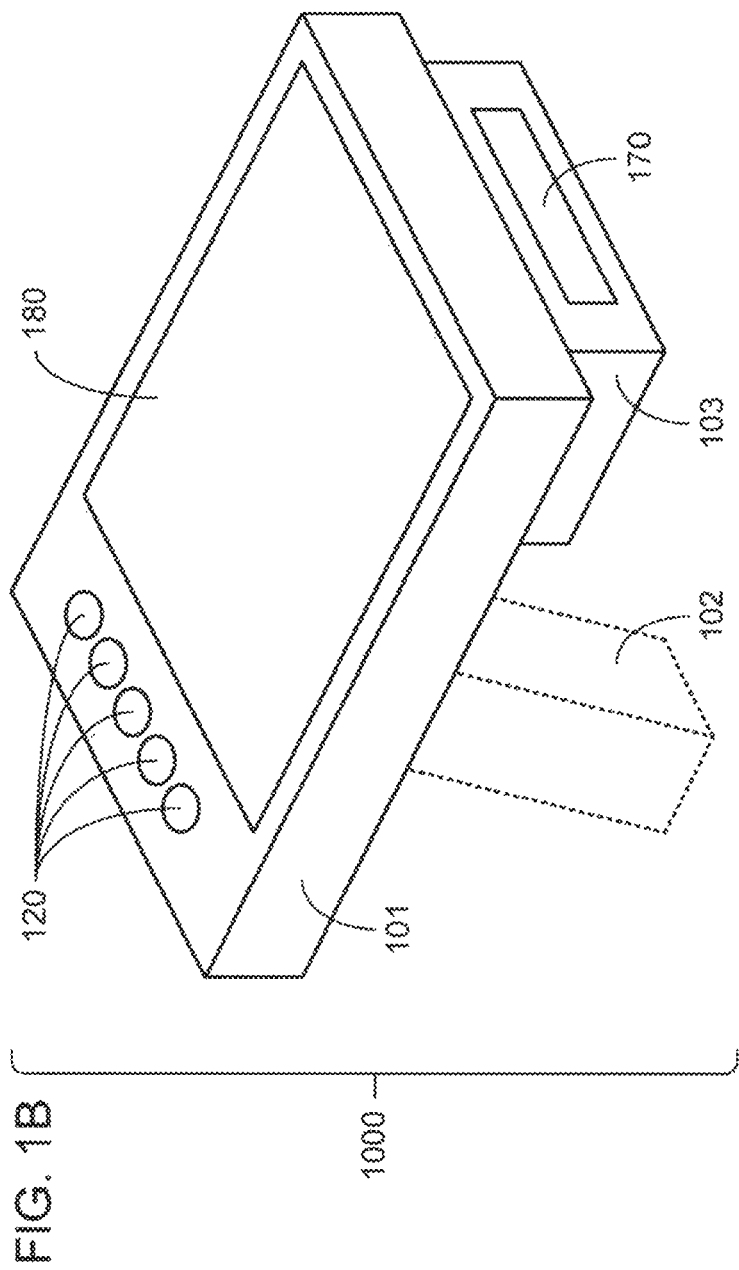
Figure 2:
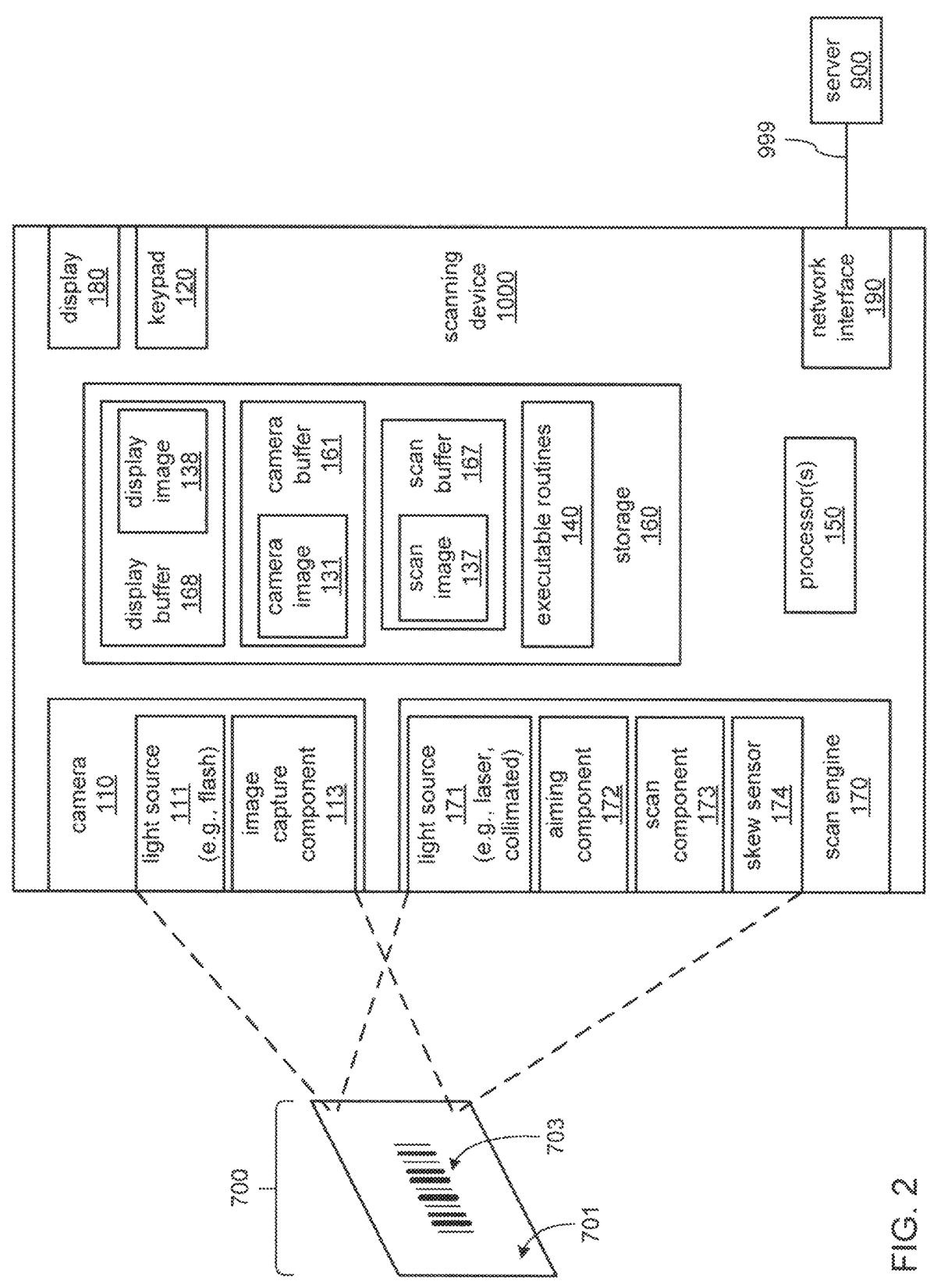
FIG. 2 is a block diagram of hardware components of the portable scanning device of FIGS. 1A-B.

FIGS. 1A and 1B, taken together, depict various external aspects of a portable scanning device 1000, and FIG. 2 depicts various internal aspects, thereof. Referring to all of FIGS. 1A-B and 2, the portable scanning device 1000 may include a camera 110 and/or a scan engine 170, one or more processors 150, a storage 160, a keypad 120, a display 180 and/or a network interface 190.

Turning more specifically to FIG. 1A, the portable scanning device 1000 may include a casing that is shaped to give the portable scanning device 1000 a generally "pistol-like" physical configuration that includes a generally elongate head portion 101 and a generally elongate grip portion 102. As depicted, an upper end of the grip portion 102 may formed integrally with the head portion 101 at an angle and at a location along the length of the head portion 101 that serves to create the pistol-like physical configuration. In some embodiments, it may be that the grip portion 102 is implemented as an optional attachment that may be removably connectable to the head portion 101. In some of such embodiments, the head portion 101 may be implemented as a fully complete portable computing device having a configuration very much like what has become commonplace in the physical configuration of typical "smart phones" in which the display 180 may make up much of one of the larger surfaces thereof. Further, it should be noted that the display 180 may be a touchscreen, which may obviate the need for the separate and distinct input devices 120 that are depicted.

Comparing FIGS. 1A and 1B, it may be that one or both of the camera 110 and the scan engine 170 are incorporated into the head portion 101. Alternatively, it may be that one or both of the camera 110 and the scan engine 170 are incorporated into an add-on module 170 that may enable one or both of the camera 110 and the scan engine 170 to be selectively attached to the rest of the portable scanning device 1000.

Turning to FIG. 2, the camera 110 and/or the scan engine 170, the storage 160, the keypad 120, the display 180 and/or the network interface 190 may each be communicatively coupled to the one or more processors 150 to exchange data therewith through the exchange of electrical, optical, magnetic and/or other signals through one or more buses and/or other form of interconnect. Each of the one or more processors 150 may be based on any of a wide variety of architectures supporting of a wide variety of instruction sets. In some embodiments, each of the one or more processors 150 may incorporate, or be otherwise accompanied by, a direct memory access (DMA) component (not specifically shown) that may be more capable of more efficiently transferring data representing images into and/or out of the storage 160. The storage 160 may store one or more executable routines 140. Alternatively or additionally, portion(s) of the storage 160 may be allocated to serve as a camera buffer 161 to store one or more camera images 131 captured by the camera 110, a scan buffer 167 to store one or more scan images 137 captured by the scan engine 170, and/or as a display buffer 168 to store one or more display images 138 currently being visually presented on the display 180 and/or that may be queue in preparation for being visually presented on the display 180.

The camera 110, if present, may be based on any of a variety of technologies, and may employ any of a variety of optical scanning and/or other image capturing techniques to capture still images and/or motion video of items within the field of view (FOV) of the camera 110 (e.g., the depicted object 700 having one or more surface 701 within the FOV). More specifically, the camera 110 may include any of a variety of image capture components 113, including and not limited to, a charge-coupled device (CCD) or complementary metal-oxide-semiconductor (CMOS) sensor providing a two-dimensional (2D) array of individual light sensors to capture either individual 2D still images, or a sequential series of 2D still images at a selected frame rate to form motion video. In some embodiments, the camera 110 may additionally incorporate, or be otherwise accompanied by, a light source 111, such as a flash to provide illumination of one or more surfaces 701 of one or more objects 700 within the FOV of the camera 110 to enhance the ability of the camera 110 to capture an image thereof.

The scan engine 170, if present, may similarly be based on any of a variety of technologies, and may similarly employ any of a variety of optical scanning and/or other image capturing techniques to capture image(s) of encoded data markings 703 (e.g., indicia, digital watermarks and/or text) carried by a portion of an object (e.g., carried on the depicted surface 701 of an object 700). More specifically, the scan engine 170 may include any of a variety of scan components 173 to effect the capture of an image that may include encoded data markings, including and not limited to, a CCD or CMOS sensor providing a single row of individual light sensors operated in a manner that sweeps over encoded data markings to perform a scan thereof, or a CCD or CMOS sensor providing a 2D array of individual light sensors to capture a 2D image of one or more encoded data markings. In some embodiments, the scan engine 170 may also incorporate, or be otherwise accompanied by, any of a variety of optical components (e.g., lenses, mirrors, color-adjusting gels, etc.—not specifically shown) that may manipulate the light arriving at the scan engine 170 from within the FOV of the scan engine 170 in any of a variety of ways before it reaches the scan component 173 of the scan engine 170.

In some embodiments, the scan engine 170 may further incorporate, or be otherwise accompanied by, any of a variety of types of light source 171 (e.g., a broad spectrum light source, single frequency light source, collimated light source, etc.—not specifically shown) that may serve to illuminate a surface 701 of an object 700 within the FOV of the scan engine 170 in a manner that enhances the ability of the scan engine 170 to capture an image of an encoded data marking 703 carried on that surface 701.

In some embodiments, the scan engine 170 may further incorporate an aiming component 172 that projects one or more visual aiming guides onto a surface 701 of an object 700 within the FOV of the scan engine 170 to aid a user of the portable scanning device 1000 in maneuvering the portable scanning device 1000 to cause an encoded data marking 703 on the surface 701 to be positioned within the FOV in preparation for being captured. An example of such a visual guide may be a single dot-shaped visual guide (not specifically shown), which may be generated by a combination of a lighting component (e.g., a light-emitting diode or an incandescent bulb) and a lens. Another example of such a visual guide may be a cross-shaped visual guide (not specifically shown) that may be generated by one or more laser diodes.

In some embodiments, the scan engine 170 may further incorporate, or be otherwise accompanied by, any of a variety of types of skew sensor 174 that detects a degree of skew between a plane of a surface 701 of an object 700 carrying an encoded data marking 703, and the plane of the images captured by the scan engine 170. The skew sensor 174 may provide an indication of the detected degree of skew together with a scan image 137 of the surface 701.

The objects 700 on which encoded data marking(s) 703 may be carried may each be any of a variety of objects, including and not limited to, a package carrying a shipping label that includes encoded data marking(s), or a product for sale within retail packaging on which encoded data marking (s) are printed as part of the graphical artwork thereof. The data encoded within such encoded data markings 703 may include, and not be limited to, data indicating the addresses of a sender and/or intended recipient of a package, or data providing a universal product code (UPC) that uniquely identifies a product for sale. Each encoded data marking 703 that is implemented as an indicia may be any of a variety of forms of 1D optically readable indicia (e.g., a barcode) or 2D optically readable indicia (e.g., a QR code), including and not limited to, one or more of Codabar; Code 2 of 5 (Interleaved); Code 2 of 5 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; UPC; Aztec Code; Code 1; ColorCode; Color Construct Code; CrontoSign; CyberCode; d-touch; Data-Glyphs; Data Matrix; Datastrip Code; digital paper; EZcode; Color; High Capacity Color Barcode; HueCode; InterCode;

MaxiCode; MMCC; NexCode; Nintendo e-Reader; Dotcode; PDF417; QR code; ShotCode; and SPARQCode.

The storage 160 may be based on any of a variety of volatile storage technologies, including and not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 160 may be based on any of a variety of non-volatile storage technologies, including and not limited to, read-only memory (ROM), erasable programmable ROM (EPROM), electrically-erasable programmable ROM (EEPROM), FLASH, etc.

Each of the one or more processors 150 may include any of a wide variety of processors, microcontrollers, gate-array logic devices, etc. that may be incorporate any of a variety of features to enhance speed and/or efficiency of processing operations. Such features may include and are not limited to, multi-threading support per core component, multiple processing core components, directly integrated memory control functionality, and/or various modes of operation by which the speed of throughput and/or level of power consumption may be dynamically alterable.

Each of the one or more processors 150 may be implemented as a single semiconductor die within a single package. Alternatively, each processor 150 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires and/or optical conductors extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the one or more processors 150 may incorporate one or more core components, one or more graphics processing unit (GPU) components, and/or one or more single-instruction multiple-data (SIMD) components to provide any of a variety of processing architectures for performing any of a variety of operations. Each of the one or more ore components, the one or more GPU components, and/or the one or more SIMD components may, themselves, employ different processing architectures supporting different portions of instruction sets to perform different operations. By way of example, each of the one or more core components may support a larger and more complex instruction set than the one or more GPU components and the one or more SIMD components, and therefore, may support a wider range of operations with a relatively limited number of operands, which may include a wider range of branching instructions. In contrast, the one or more GPU components and/or the one or more SIMD components may support a smaller and less complex instruction set than the one or more core components, but may support the performance of that narrower range of operations across numerous operands at least partially in parallel. For the one or more GPU components, this may be realized through the at least partially parallel performance of the same operations on many separate pieces of data across numerous GPU cores. For the one or more SIMD components, this may realized with sets of multiple operands supported in side-by-side lanes within each of one or more SIMD registers. However, the one or more GPU components, and the one or more the SIMD components may not support branching instructions. As a result, in executing instructions, the operation and use of the one or more GPU components and/or of the one or more SIMD component may be controlled by the one or more core components.

The network interface 190 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the network interface 190 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1× RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 3A:
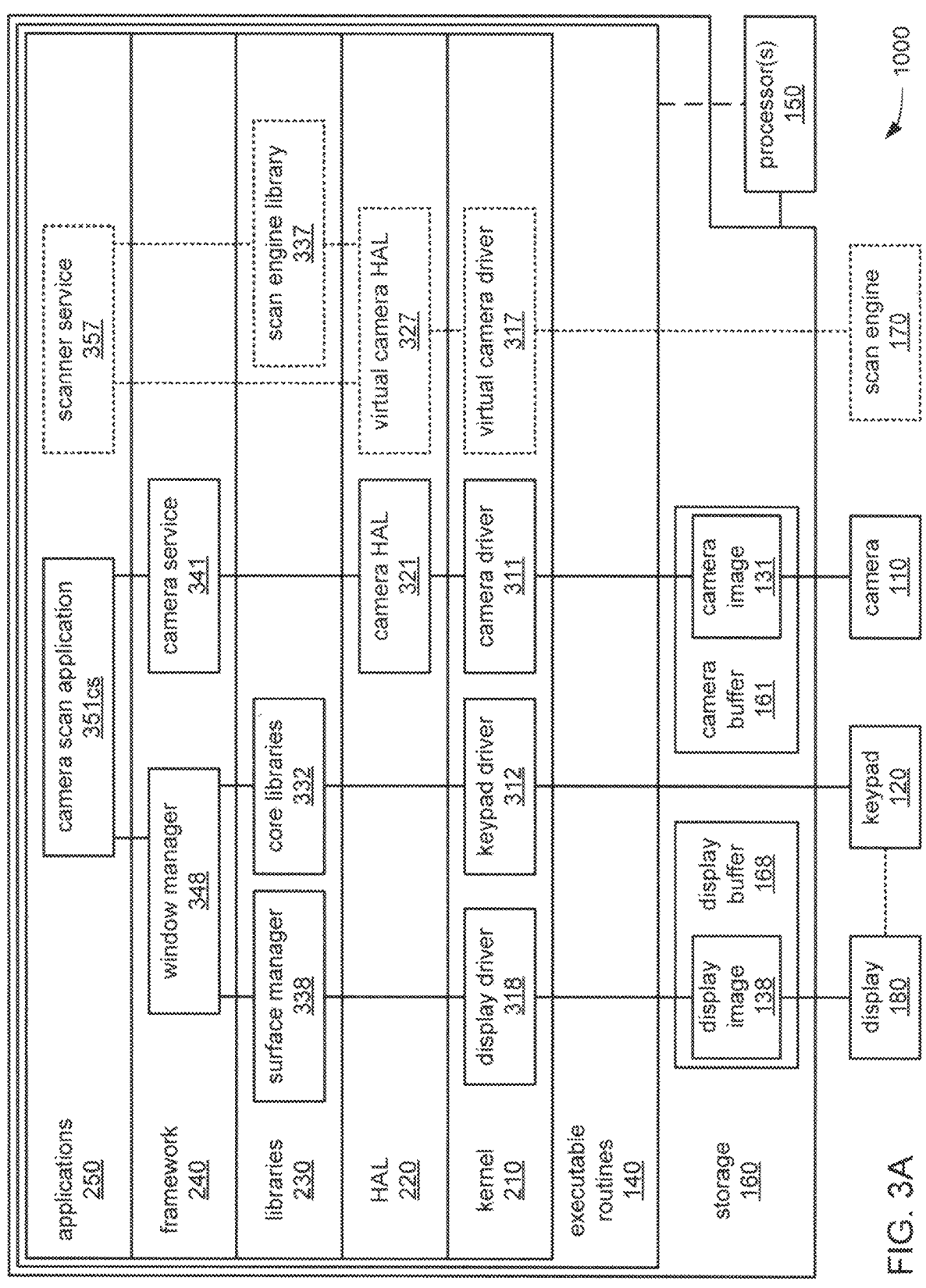
FIGS. 3A and 3B, together, provide block diagrams of an architecture of an operating system and related software components of the portable scanning device of FIGS. 1A-B.
Figure 3B:
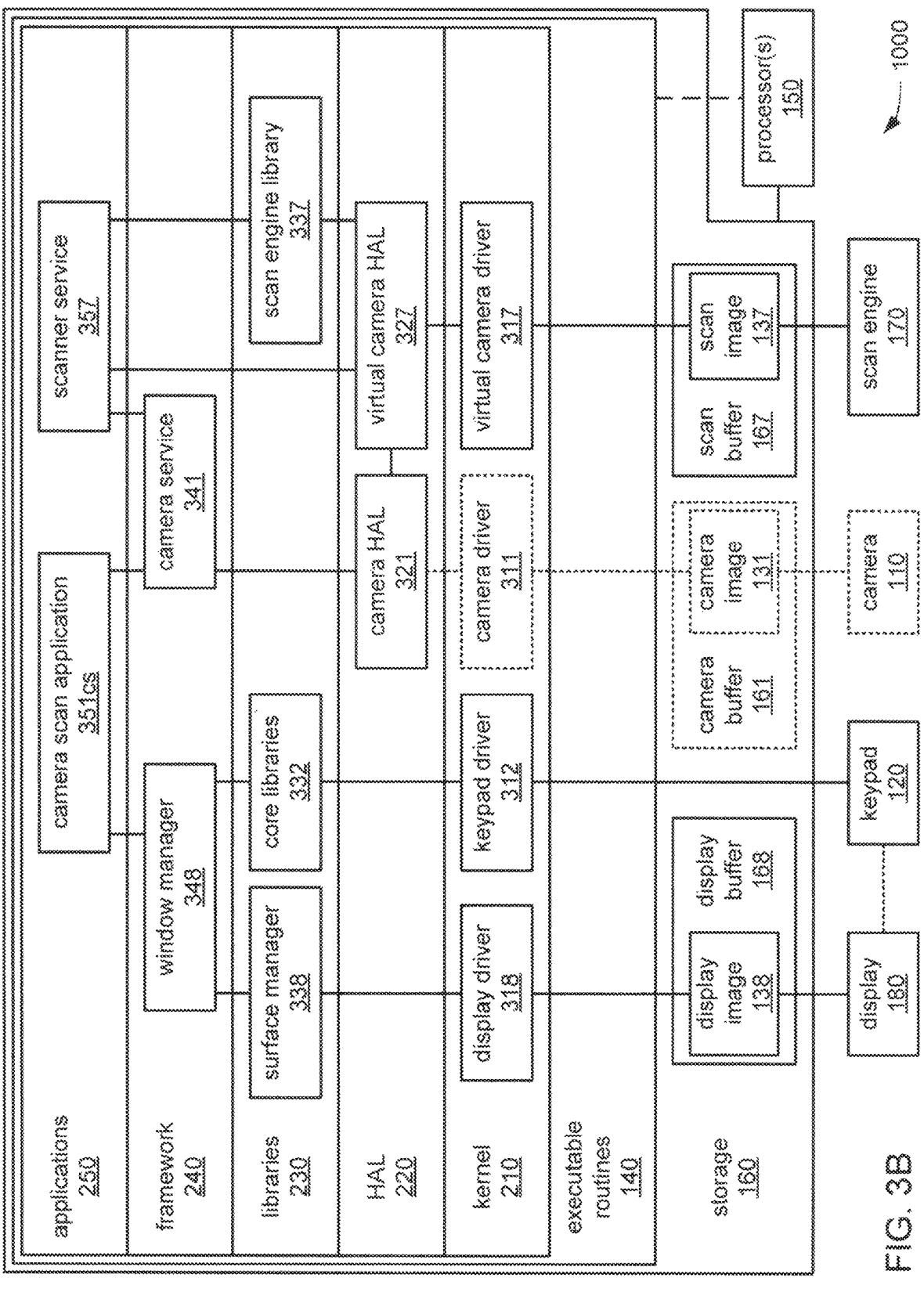

FIGS. 3A and 3B, taken together, depict aspects of the internal architecture of the Android operating system as incorporated into the portable scanning device 1000, and the manner in which the executable routines 140 thereof interact with each other and with various hardware components of the portable scanning device 1000 when executed by the processor(s) 150. FIG. 3A depicts aspects of such interactions at a time prior to when a change is made to use the scan engine 170 to capture images of encoded data markings, and to use software components associated with the scan engine 170 to identify and decode those encoded data markings. FIG. 3B depicts aspects of such interactions after the change is made to so use the scan engine 170 and associated software components.

Turning to FIG. 3A, as will be familiar to those skilled in the art, in the Android operating system, like many other operating systems, the executable routines 140 are organized into various layers that span from a lowest layer of the kernel 210 that is in more direct communication with hardware components to a highest layer of applications 250 that has little (if any) direct contact with hardware components. As will be familiar to those skilled in the art, as the processor(s) 150 execute various ones of the depicted executable routines 140, at least some of these depicted layers may represent boundaries of differing privilege levels that the processor(s) 150 are caused to enforce as part of a system of security in which executable routines 140 at the highest layer of applications 250 are given the most restricted level of privileges, while executable routines 140 at the lowest layer of the kernel 210 are given the least restricted level of privileges. Thus, the processor(s) 150 may be caused to allow the widest ranging access to storage locations within the storage 160 to executable routines 140 at the level of the kernel 210.

The kernel 210 includes various device drivers among the executable routines 140 for execution by the processor(s) 150 that each provide a lower level of abstraction in interfacing between hardware components and other lower level and/or middle level ones of the executable routines 140. Each device driver may be written to interact with a specific hardware component or family of hardware components. As depicted, such device drivers may include a display driver 318 to control the visual presentation of images on the display 180; a keypad driver 312 to control and monitor for manual inputs entered via the keypad 120 (and/or via the touchscreen functionality of the display 180 in embodiments that include such functionality); and/or a camera driver 311 that is at least intended to control the operation of the camera 110 (in embodiments that include the camera 110) in capturing images that may have nothing to do with encoded data markings on surfaces of objects. As also depicted, such device drivers may also include a virtual camera driver 317 to enable operation of the scan engine 170 as if it were a more conventional camera (e.g., like the camera 110) while using the scan engine 170 to capture images of encoded data markings. It may be that the virtual camera driver 317 is already stored within the storage 160 of the portable scanning device 1000 in preparation for a registration process of the Android operating system that is performed by the processor(s) 150 to make the virtual camera driver 317 accessible to other software components in a manner that enables such camera like operation of the scan engine 170.

The hardware abstraction layer (HAL) 220 includes ones of the executable routines 140 for execution by the processor(s) 150 that may each communicate with one or more device drivers in the kernel 210 that are associated with one or more particular hardware components that fall within a particular category of hardware components, and that may each provide a single unified interface for that particular category as a layer of abstraction for other middle level ones of the executable routines 140. In various embodiments each such interface that is so provided may be configured to conform to a particular widely used industry standard interface for the corresponding particular category of hardware components. In this way, and in cooperation with the device drivers of the kernel 210, developers of routines at higher levels are provided with a consistent interface that enables access to hardware components of one or more particular categories in a manner that changes little (if at all) over time in spite of changes that may be made to the hardware components, themselves. As depicted, the HAL 220 may include at least a camera HAL 321 that provides a single consistent interface to higher level ones of the executable routines 140 for controlling cameras, where that interface changes little (if at all) despite whatever type of camera (e.g., the camera 110, or another) is used to capture images. As also depicted, the HAL 220 may also include a virtual camera HAL 327 to cooperate with the virtual camera driver 317 in enabling operation of the scan engine 170 as if it were a more conventional camera (e.g., like the camera 110) while using the scan engine 170 to capture images of encoded data markings.

The libraries 230 includes ones of the executable routines 140 for execution by the processor(s) 150 that may each provide callable function routines associated with a particular range of commonly used functions. Some of those ranges of commonly used functions may be associated with a particular category of hardware component such that the callable functions thereof are meant to interact with hardware components of a particular category through executable routine(s) 140 at the layer of the HAL 220 and/or through device driver(s) at the layer of the kernel 210. As depicted, the libraries 230 may include a surface manager 338 to provide callable function routines that perform such commonly used functions as storing portions of an image within the display buffer 168 to cause that image to be visually presented on the display 180; and/or core libraries 332 to provide callable function routines that perform such commonly used functions as retrieving manually entered input from the keypad 120 and/or other manually-operable input devices (e.g., the touchscreen functionality of the display 180 in embodiments that include such functionality). As also depicted, the libraries 230 may also include a scan engine library 337 to provide callable function routines that perform such commonly used functions as capturing an image of a surface of an object that may carry one or more encoded data markings.

The framework 240 includes ones of the executable routines 140 for execution by the processor(s) 150 that may each provide still higher level callable functions associated with a larger range of functionality. In some embodiments executable routines 140 at the level of the framework 240 may provide sets of object classes with callable methods. As depicted, the framework 240 may include a window manager 348 that may include higher level callable functions to cause the visual presentation of images, and/or to cause the monitoring for manual input (e.g., a button press) indicative of a command that may cause a change in image(s) that are visually presented; and/or a camera service 341 that may include higher level callable functions to cause operation of a conventional camera (e.g., the camera 110) to capture images.

The applications 250 include ones of the executable routines 140 for execution by the processor(s) 150 that may be the actual application routines that a user of the portable scanning device 1000 may more directly interact with. As depicted, the applications 250 may include a camera scan application 351*cs* that may provide a user the ability to control aspects capturing images of encoded data markings carried on surfaces of objects with a conventional camera (e.g., the camera 110), and/or to perform aspects of identifying and/or decoding such encoded data markings.

Turning to FIG. 3B, following the performance of a registration process of the Android operating system by the processor(s) 150, various software routines associated with the scan engine 170 may become integrated with other software routines of the Android operating system such that those software routines associated with the scan engine 170 become accessible to those other software routines of the Android operating system.

More specifically, and as depicted, the virtual camera HAL 327 may become directly linked to the camera HAL 321, thereby enabling the virtual camera driver 317 to become indirectly linked therethrough to the camera HAL 321. In this way, the scan engine 170 may become accessible to the camera HAL 321 as if the scan engine 170 were a more conventional camera (e.g., like the camera 110) that may be selected for use in capturing images.

Also more specifically, and as also depicted, the scanner service 357 may become linked to the camera service 341, thereby enabling the virtual camera driver 317 to become indirectly linked to the camera service 341 through both the scanner service 357 and the virtual camera HAL 327. In this way, the camera service 341 may control at least the activation of the virtual camera driver 317.

As also depicted, the performance of such a registration process by the processor(s) 150 may also cause the instantiation of the scan buffer 167 to store the one or more scan images 137 depicting encoded data markings, as captured by the scan engine 170.

Figure 4A:
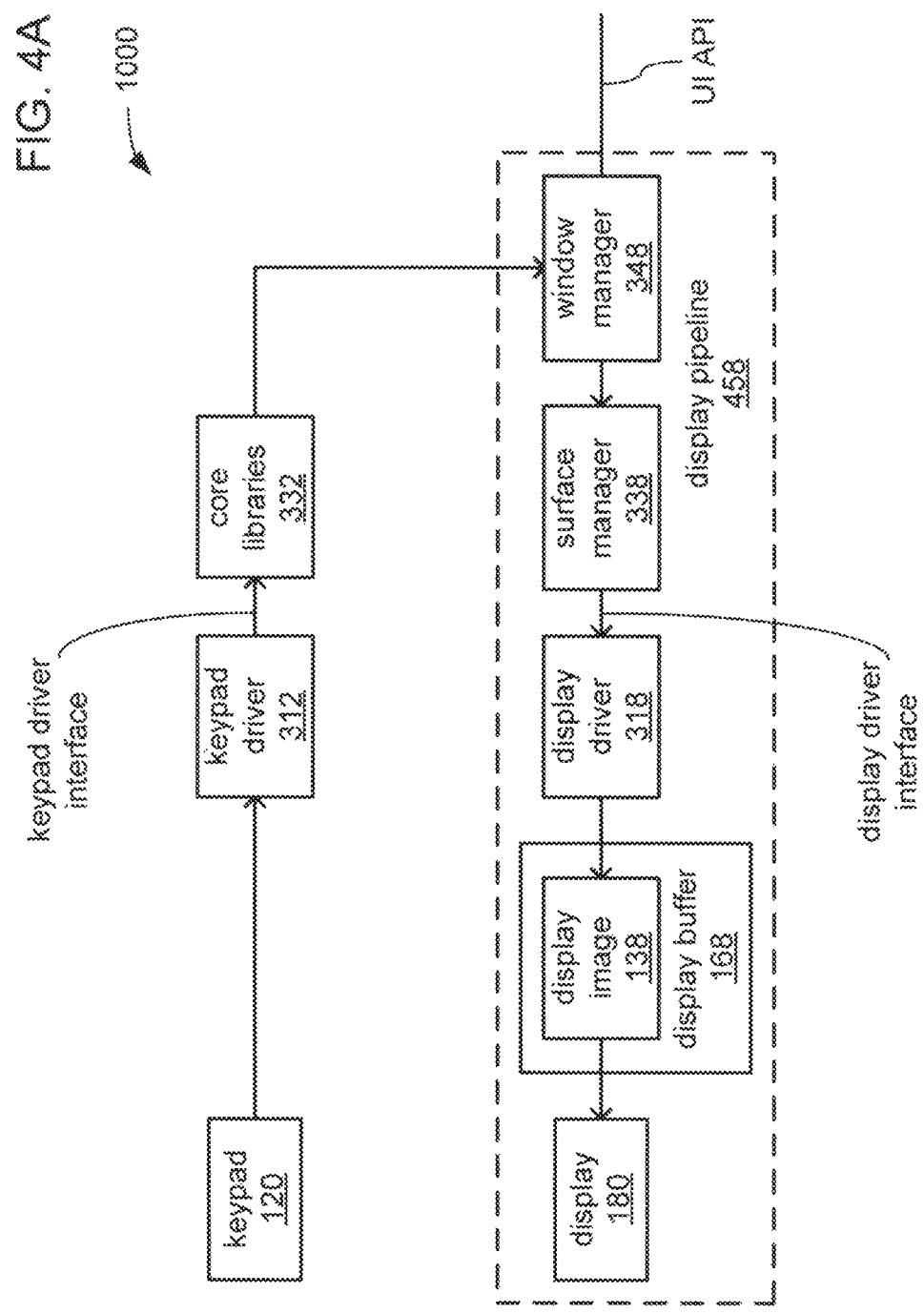
FIGS. 4A, 4B, 4C and 4D, together, provide block diagrams of pipelines and cooperation among pipelines within the architecture of FIGS. 3A-B to perform such functions as to receive manual input, display images, capture images of objects with a conventional camera, and scan encoded data markings with a scan engine.
Figure 4B:
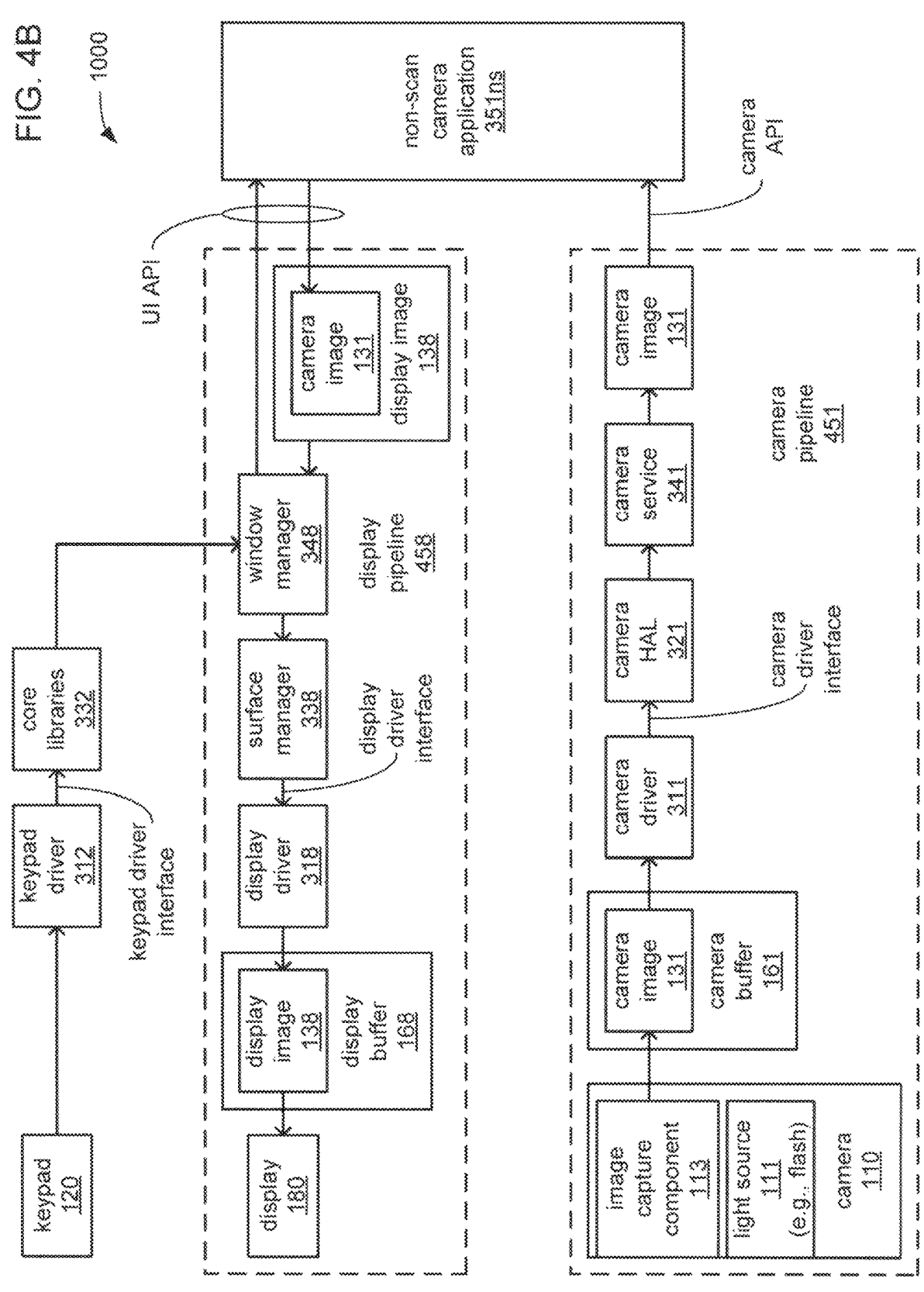

FIGS. 4A through 4D, taken together, depict aspects of the manner in which sets of the executable routines 140 may cooperate to form and define various pipelines. More specifically, FIG. 4A depicts such aspects of a display pipeline 458; FIG. 4B depicts such aspects of a camera pipeline 451; and FIGS. 4C and 4D, together, depict such aspects of a scan pipeline 457.

Turning to FIG. 4A, the display pipeline 458 may include the display 180, itself, the display buffer 168, the display driver 318, the surface manager 338, and the window manager 348. As previously discussed, the display driver 318 may be matched to one or more particular hardware components (e.g., a graphics processing unit (GPU)—not specifically shown) that generate a display image 138 within the display buffer 168, that retrieve a display image 138 from the display buffer 168, and/or that drive the display 180 to visually present a display image 138. The display driver 318 may provide a display driver interface for communications with the surface manager 338. The surface manager 338 and the window manager 348 may provide mid-level and higher-level programming interfaces, respectively, based on callable routines that still higher-level ones of the executable routines 140 at the level of the applications 250 may use to cause the generation and/or visual presentation of a display image 138 on the display 180.

In some embodiments, and as depicted, the window manager 348 may cooperate with still other software components, such as the depicted keypad driver 312 and/or the depicted core libraries 332, as well as with the display driver 318 and/or the surface manager 338, to control aspects of both input and output operations associated with providing a user interface (UI) to a user of the portable scanning device 1000. In so doing, the window manager 348 may provide a UI API through which application routines may employ the UI as part of interacting with the user. As previously discussed, the keypad driver 312 may be matched to a particular model of the keypad 120, to touch-sensing hardware co-located with the display 180, and/or to still other hardware components, to receive manual input from a user. The keypad driver 312 may provide a keypad driver interface for communications with the core libraries 332. The core libraries 332 may provide a mid-level programming interface based on callable routines that various executable routines 140 at the higher levels of the framework 240 and/or the applications 250 may use (e.g., the UI API of the window manager 348 for applications) to receive and interpret manual input to identify the entry of data and/or commands by a user.

FIG. 4B presents details of components of the camera pipeline 451, as well as the manner in which the camera pipeline 451 may be used together with the display pipeline 458, and together with a non-scan camera application 351*ns* that is written to employ a conventional camera (e.g., the camera 110) to capture images of objects other than encoded data markings.

As depicted, the camera pipeline 451 may include the camera 110, itself, the camera buffer 161, the camera driver 311, the camera HAL 321, and the camera service 341. As previously discussed, the camera driver 311 may be matched to one or more particular hardware components, such as the camera 110 with its built-in light source 111. The camera driver 311 may provide a camera driver interface for communications with the camera HAL 321. The camera HAL 321 may provide a mid-level programming interface based on callable routines to the camera service 341, which in turn, may provide a higher-level programming interface based on callable routines that serves as a camera API to executable routines 140 at the level of the applications 250. Such applications as the depicted non-scan camera application 351*ns* may be written specifically to use such a camera API to control operation of the camera 110, the light source 111 and/or the image capture component 113 to illuminate and/or capture camera image(s) 131 of various objects within the FOV of the camera 110, and/or to store the camera image(s) 131 within the camera buffer 161. Accordingly, such applications as the non-scan camera application 351*ns* may not be written to use another API (e.g., a scan API) to perform such functions.

Beginning with the camera 110, an image of an object within the FOV of the camera 110 may be captured by the image capture component 113 thereof, and stored as a camera image 131 within the camera buffer 161. The camera image 131 may then be relayed through the camera driver 311, the camera HAL 321 and the camera service 341, and then provided to the non-scan camera application 351*ns*.

As will be familiar to those skilled in the art, and as depicted, use of the camera 110 may entail using the camera pipeline 451 together with the display pipeline 458 to enable a user to capture a camera image 131 of particular object(s) and/or other scenery. More specifically, the display 180 may be used to provide a view of what is currently within the FOV of the camera 110 to enable a user of the portable scanning device 1000 to move the portable scanning device 1000 as needed to aim the camera 110. As depicted, this is accomplished by a non-scan camera application 351*ns* relaying the current camera image 131 received from the camera pipeline 451, and to the display pipeline 458 to become incorporated into the display image 138 that is currently visually presented on the display 180.

Such cooperative use of the camera pipeline 451 with at least a portion of the display pipeline 458 may also be relied upon to enable manual input to be received for the triggering the use of the camera 110 to capture a camera image 131. More specifically, and regardless of whether the display 180 is used in aiming, at least the window manager 348 of the display pipeline 458 may be used together with the keypad driver 312 and/or the core libraries 332 to monitor the keypad 120 (and/or other input devices) for manual input that provides a command to operate the image capture component 113 of the camera 110 to capture a camera image 131.

Figure 4C:
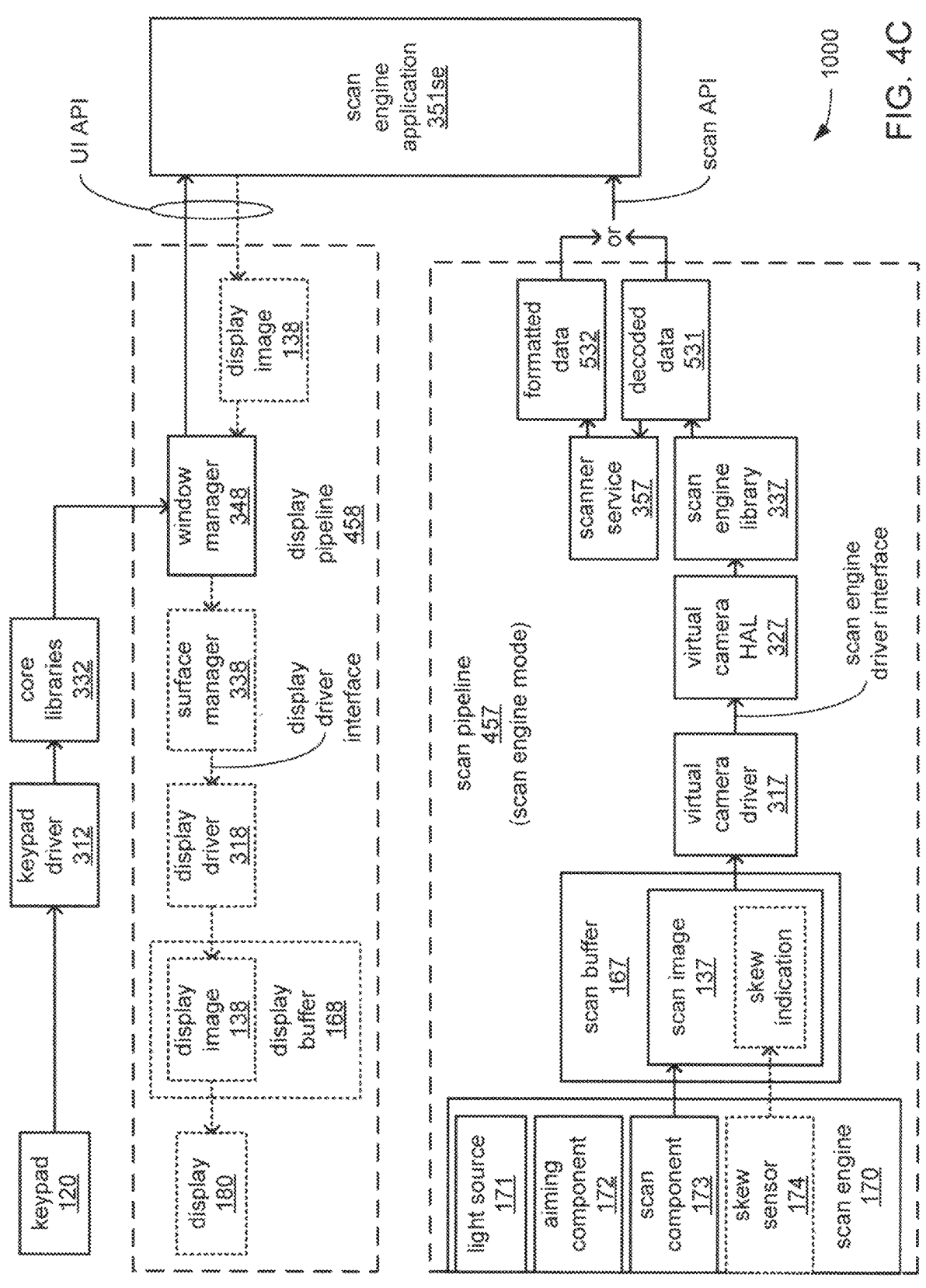
Figure 4D:
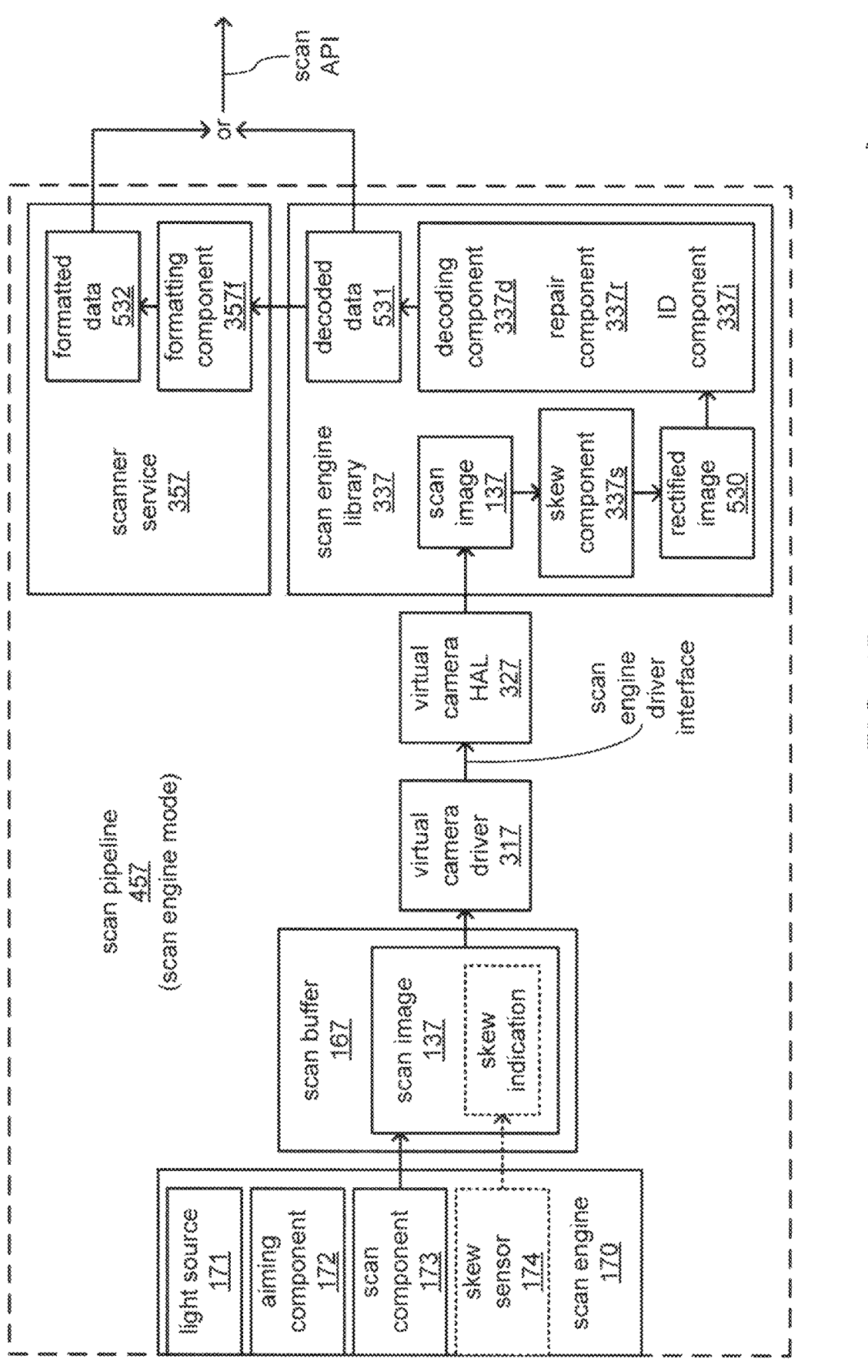

FIGS. 4C and 4D, together, present details of various components of the scan pipeline 457, as well as the manner in which the scan pipeline 457 may be used in a scan engine mode in which it cooperates with at least a portion of the display pipeline 458, and/or with a scan engine application 351*se* that is specifically written to employ a scan engine (e.g., the scan engine 170) to capture images of encoded data markings, instead of being specifically written to employ a more conventional camera (e.g., the camera 110), to do so.

In some embodiments, it may be that the scan pipeline 457 is able to be operated in either of two modes: 1) a scan engine mode and 2) a virtual camera mode. In the scan engine mode, which is depicted in FIGS. 4C-D, the scan pipeline 457 enables a scan engine application 351*se* (which is specifically written to employ a scan engine) to operate the scan engine 170 as a scan engine, and not as if it is a more conventional camera. In the virtual camera mode, which is depicted in FIGS. 5B-C and 6, the scan pipeline 457 enables a camera scan application 351*cs* (which is specifically written to employ a more conventional camera) to operate the scan engine 170 as if it is a more conventional camera, and not as a scan engine.

However, in other embodiments, it may be that the scan pipeline 457 is able to be operated in just the virtual camera mode that is discussed, later, in connection with FIGS. 5B-C and 6. Again, FIGS. 4C-D and the accompanying discussion in the immediately following paragraphs focuses on the scan engine mode.

Focusing on FIG. 4C, as depicted, the scan pipeline 457 may include the scan engine 170, itself, the scan buffer 167, the virtual camera driver 317, the virtual camera HAL 327, the scan engine library 337, and/or the scanner service 357. As previously discussed, the virtual camera driver 317 may be matched to one or more particular hardware components, such as the scan engine 170 with its built-in light source 171, its built-in aiming component 172, and/or its built-in skew sensor 174 (in some embodiments). The virtual camera driver 317 may provide a scan engine driver interface for communications with the virtual camera HAL 327. The virtual camera HAL 327 may provide a mid-level programming interface based on callable routines to the scan engine library 337, which in turn, may communicate with the scanner service 357.

As depicted, and as will shortly be explained in greater detail, in differing embodiments, either the scan engine library 337 or the scanner service 357 may provide a higher level programming interface based on callable routines that serves as a scan API to executable routines 140 at the level of the applications 250. Again, such applications as the depicted scan engine application 351*se* may be written specifically to work with a scan engine, such as the scan engine 170. Thus, the depicted scan engine application 351*se* may be written to use such a scan API to control operation of the scan engine 170, the light source 171, the aiming component 172, the scan component 173, and/or the skew sensor 174 (if present) to illuminate, to project a visual aiming guide at, and/or to capture scan image(s) 137 of encoded data marking(s) at which the scan engine 170 is aimed, and/or to store the scan image(s) 137 within the scan buffer 167. Accordingly, such applications as the scan engine application 351*se* may not be written to use another API (e.g., a camera API) to perform such functions.

Focusing on FIG. 4D, as depicted, the scan engine library 337 may include multiple components to perform various functions pertinent to the capture, identification and decode of encoded data markings. Such components may include one or more of a skew component 337*s*, an identification (ID) component 337*i*, a repair component 337*r*, and/or a decoding component 337*d*. Also, the scanner service 357 may include a formatting component 357*f* to perform functions pertinent to the reformatting of the data that is so decoded from encoded data markings.

Returning to both FIGS. 4C-D, and beginning with the scan engine 170, an image of one or more encoded data markings at which the scan engine 170 is aimed may be captured by the scan component 173 thereof, and stored as a scan image 137 within the scan buffer 167. The scan image 137 may then be relayed through the virtual camera driver 317 and the virtual camera HAL 327, to the scan engine library 337. Within the scan engine library 337, each encoded data marking within the scan image 137 may be identified, repaired and/or decoded to thereby retrieve at least a portion of the depicted decoded data 531 from that encoded data marking. In other words, the decoded data 531 may include data retrieved from one or multiple encoded data markings within a scan image 137. In some embodiments, the decoded data 531 may then be provided to the scan engine application 351*se* through the scan API without formatting and/or other changes to its content.

However, in other embodiments, the decoded data 531 may, instead, be provided to the scanner service 357. Within the scanner service 357, the decoded data 531 may be subjected to one or more formatting changes, thereby generating the depicted formatted data 532. In such other embodiments, it may then be the formatted data 532, and not the decoded data 531, that is provided to the scan engine application 351*se* through the scan API.

As previously discussed, in some embodiments, the scan engine 170 may include (or be otherwise accompanied by) a variant of the light source 171 that is able to output one or more particular types of light that may serve to enhance the ability to capture an image of an encoded data marking carried on a surface of an object. As will be familiar to those skilled in the art, it may be that particular forms of monochromatic and/or collimated light are able to make the relatively fine visual details of an encoded data marking easier to distinguish from portions of a surface of an object that surround and/or are underneath that encoded data marking. Additionally, the scan component 173 of the scan engine 170 may be selected to have light sensors that may be tuned to be more sensitive to light at the particular frequency or range of frequencies emitted by the light source 171. Alternatively or additionally, the scan component 173 may be provided with lense(s), filter(s), mirror surface(s), etc. that impart such frequency-specific sensitivity to the light sensors of the scan component 173. In contrast, and as previously discussed, the light source 111 of the camera 110 may a more typical type of lighting component that is employed as a flash (e.g., a white LED, a xenon flash, etc.), and that is incapable of outputting such particular types of light.

As also previously discussed, in some embodiments, the scan engine 170 may include (or be otherwise accompanied by) the aiming component 172 to enable a user of the portable scanning device 1000 to more effectively aim the scan engine 170 towards a surface of an object and/or towards a particular encoded data marking carried on that surface. Again, in various embodiments, the aiming component 172 of the scan engine 170 may project a visual aiming guide indicative of what the scan engine 170 is currently aimed at, such as a projected dot, projected crosshairs, etc. This enables the scan engine 170 to be aimed by observing what the visual aiming guide is currently projected onto.

However, even with a projected visual aiming guide provided by the aiming component 172, at least a portion of the display pipeline 458 may still be relied upon to enable manual input to be received for the triggering the use of the scan engine 170 to capture a scan image 137. More specifically, and regardless of whether the display 180 or the aiming component 172 is used in aiming, at least the window manager 348 of the display pipeline 458 may be used together with the keypad driver 312 and/or the core libraries 332 to monitor the keypad 120 (and/or other input devices) for manual input that provides a command to operate the scan component 173 of the scan engine 170 to capture a scan image 137.

As further previously discussed, in some embodiments, the scan engine 170 may include (or be otherwise accompanied by) the skew sensor 174 to detect a degree of skew between the plane of a surface of an object captured in a scan image 137 (and which may carry one or more encoded data markings thereon), and the plane of the scan image 137, itself. Again, in such embodiments, an indication of the degree of skew in a scan image 137 may be incorporated into the scan image 137, or may otherwise accompany the scan image 137 when conveyed to the scan engine library 337. In such embodiments, the skew component 337s of the scan engine library 337 may employ such an indication to manipulate the image to at least mitigate such a skew, and thereby generate the depicted rectified image 530. In contrast, such conventional cameras as the camera 110 may entirely lack an equivalent to the skew sensor 174.

In other embodiments that do not include the skew sensor 174, the scan image 137 may be unaccompanied by any form of skew indication from the scan engine 170. In such other embodiments, it may be that the skew component 337s may employ various algorithms to derive the degree of skew between the plane of the surface of the object captured in the scan image 137 that carries one or more encoded data markings thereon, and the plane of the scan image 137, itself. The skew component 337s may then employ this derived degree of skew to generate the rectified image 530.

The ID component 337i may employ various algorithms for identifying portions of the scan image 137 (or portions of the rectified image 530 in embodiments that include the skew component 337s) that have a pattern among adjacent pixels that is at least consistent with an encoded data marking being present thereat. At each such identified location, the repair component 337r may employ various algorithms for identifying and repairing various types of damage to an encoded data marking (e.g., scratches, smearing, tears, folds, partial obliterations, partial occlusions, etc.) to thereby improve the readability of encoded data markings. The decoding component 337d may employ a variety of algorithms to identify types of encoded data markings and/or formatting used therein to decode the data that is encoded within each encoded data marking, thereby performing the retrieval of the decoded data 531. Again, as will be familiar to those skilled in the art, among the types of encoded data markings are multiple types of 1D barcodes, 2D barcodes, watermarking, and human-readable text in any of a variety of languages. There are also a wide variety of differing formatting details associated with each type of encoded data marking, and some of such types and/or formats may be relatively obscure.

As discussed above, in some embodiments, it may be that the scan engine library 337 is able to provide a scan API that enables applications written to use the scan engine 170 as a scan engine (e.g., the scan engine application 351se) to do so (i.e., using the scan pipeline 457 in the scan engine mode of FIGS. 4C-D). Again, in such embodiments, it may be that such applications are then provided with the decoded data 531 for the one or more encoded data markings within each scan image 137.

However, as also discussed above, in other embodiments, it may be that the scanner service 357 is able to provide such a scan API. And again, in such embodiments, it may be that such applications are then provided with the formatted data 532 for the one or more encoded data markings within each scan image 137. In such other embodiments, the formatting component 357f may perform various conversions of the formatting of the decoding data 531 to generate the formatted data 532. Such conversions may include, and are not limited to, conversions between time and/or date formats (e.g., the order among month, day and year, or a selection between 12-hour time and 24-hour "military" time); conversions between quantities of bits and/or bytes used to encode integer and/or floating point values; conversions between different forms of text encoding (e.g., a selection among ASCII, EBCDIC, or various double-byte character encodings, etc.); conversions between choices of delimiters between data values (e.g., differing punctuation marks, a selection among types of carriage return characters, etc.); conversions between quantities of bytes and/or color encodings for images; conversions between languages and/or between different versions of language (e.g., U.S. English vs. British English); different prefixes and/or suffixes used to mark the start and/or end of data; and/or different data structures (e.g., arrays of differing dimensions and/or other characteristics, or a selection of an array or a linked list data structure).

At various times, it may be that a user of the scanning device 1000 is provided with an opportunity to specify particular formatting details for the formatted data 532 that may be provided to application routines that are written to make use of a scan API. By way of example, such an opportunity may be provided to such a user during a use of a registration procedure supported by the operating system used within the scanning device 1000 (e.g., the Android operating system) as discussed above in reference to FIG. 3B.

Regardless of whether a scan API is provided by the scan engine library 337 or the scanner service 357, the ability of an application routine to interact via a scan API (e.g., the scan engine application 351*se*) with the scan pipeline 457 in a scan engine mode may enable a greater degree of integration and cooperation with the scan pipeline 457 than may be possible when interacting in a manner that treats the scan engine 170 as a more conventional camera (i.e., using the scan pipeline 457 in the virtual camera mode of FIGS. 5B-C and 6). More specifically, a scan API would be designed to support the exchange of commands and/or parameters that may be unique to using scan engines, unlike a camera API that would be designed to support the exchange of commands and/or parameters that may be unique to using cameras.

Figure 5A:
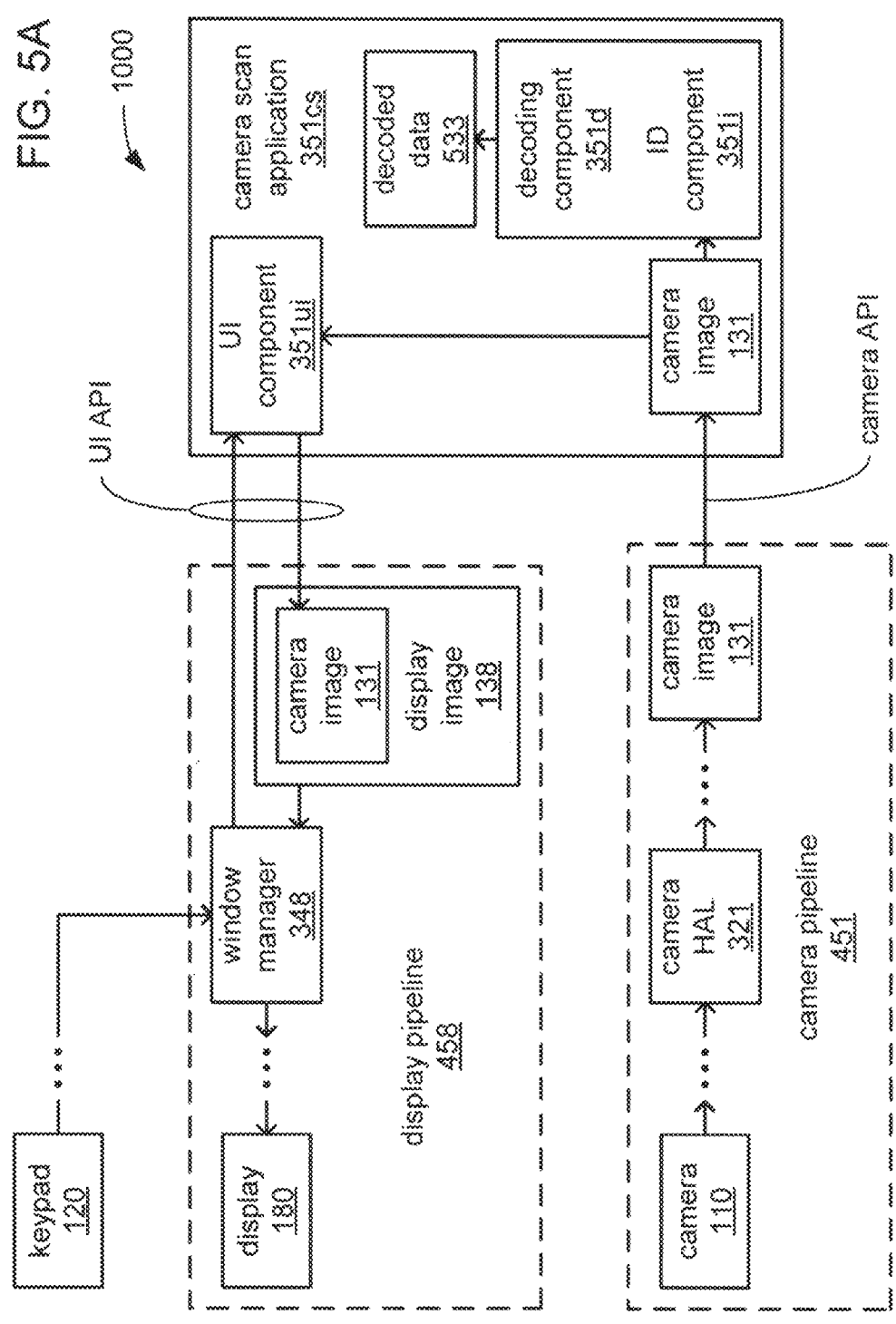
FIGS. 5A, 5B and 5C, together, provide block diagrams of pipelines and cooperation among pipelines within the architecture of FIGS. 3A-B to perform such functions as use a scan engine as if it is a more conventional camera to capture images of encoded data markings.
Figure 5B:
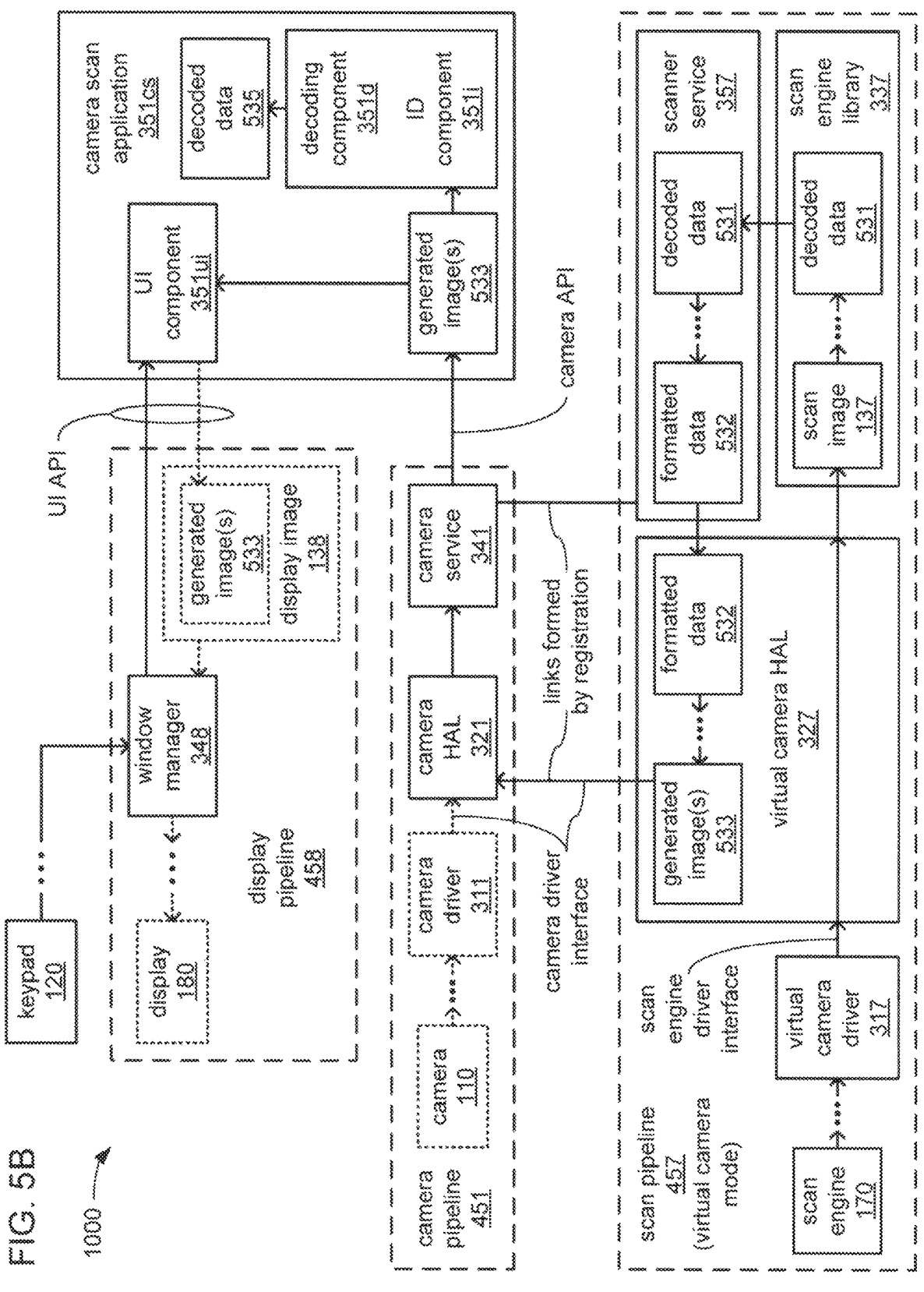
Figure 5C:
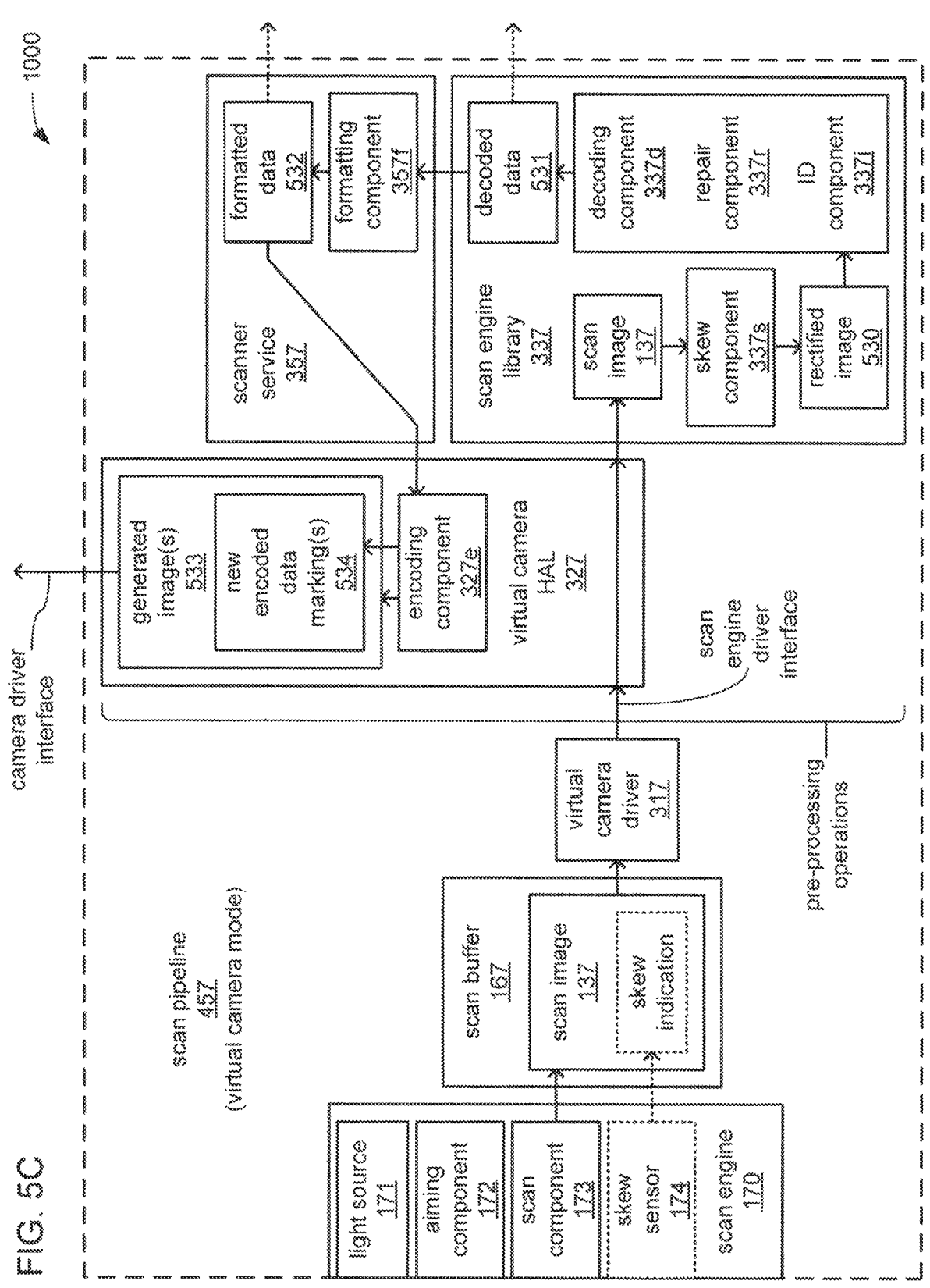
Figure 6:
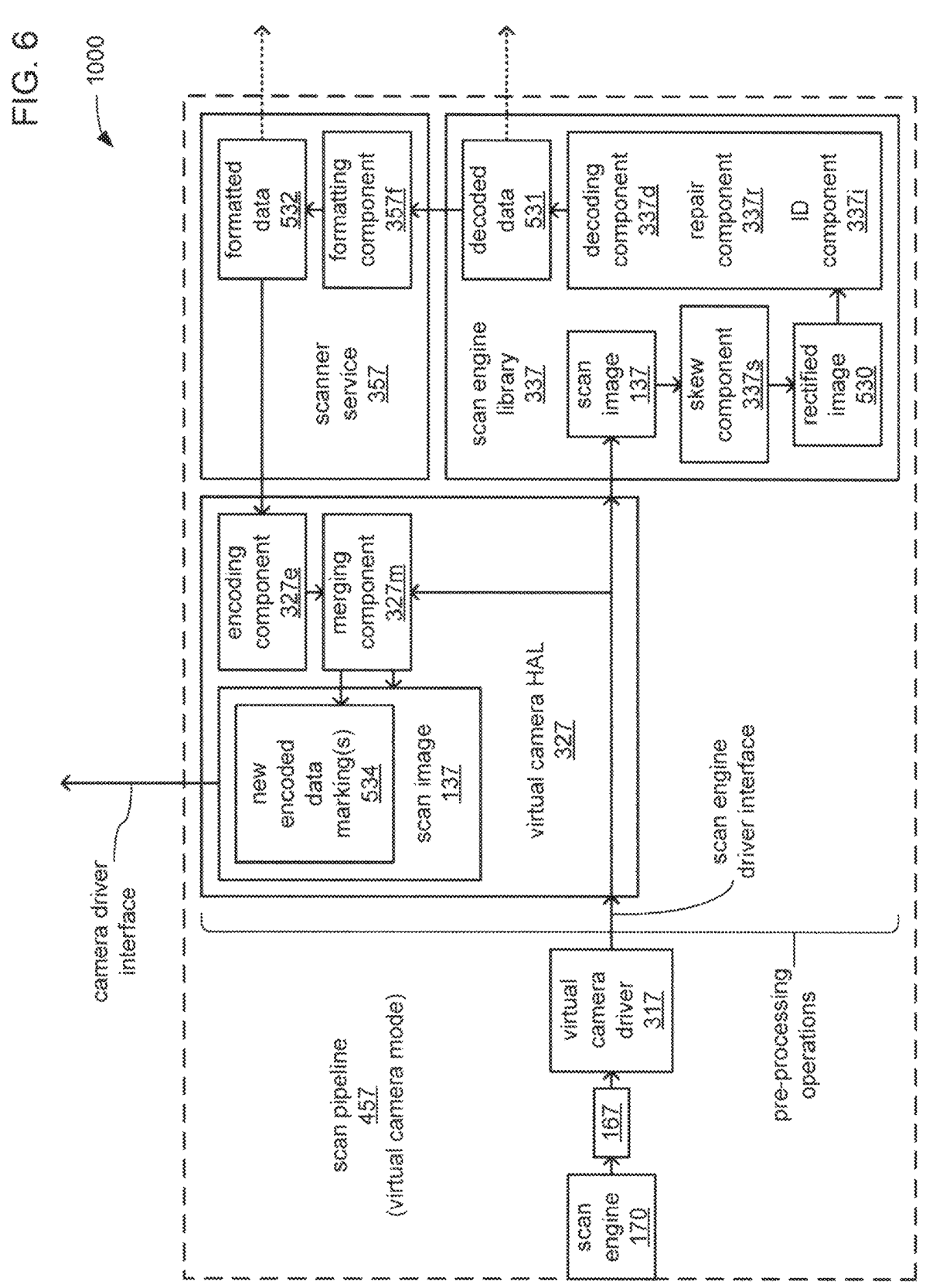
FIG. 6 provides a block diagram of an alternate embodiment of cooperation among pipelines within the architecture of FIGS. 3A-B to use a scan engine as if it is a more conventional camera to capture images of encoded data markings.

FIGS. 5A through 5C, taken together, depict aspects of the manner in which combinations of the pipelines 451, 457 and 458 may cooperate to capture, identify, repair and/or decode encoded data markings in a manner in which a scan engine is treated as if it is a more conventional camera. More specifically, FIG. 5A depicts aspects of cooperative use of the camera pipeline 451 together with the display pipeline 458 to enable the camera 110 to be used as a camera to capture an image of an encoded data marking; and FIGS. 5B-C, together, depict aspects of using the scan pipeline 457 in the virtual camera mode together with at least a portion of the camera pipeline 451 and at least a portion of the display pipeline 458 to enable the scan engine 170 of to be used as if it is a more conventional camera to capture an image of an encoded data marking.

FIG. 5A provides a view, somewhat similar to FIG. 4B, of aspects of using the camera 110 in a manner that entails cooperation between the camera pipeline 451 and the display pipeline 458. However, whereas FIG. 4B focuses more on general aspects of using the camera 110 to capture camera images 131 of objects other than encoded data markings, FIG. 5A focuses more on aspects of using the camera 110 to capture camera images 131 of encoded data markings as part of decoding the data encoded therein. Thus, the non-scan camera application 351*ns* of FIG. 4B is replaced in FIG. 5A with the camera scan application 351*cs* that is written to use the camera 110 to capture camera images 131 that include encoded data markings through the camera API and the camera pipeline 451.

As previously discussed in connection with FIG. 4B, aiming the camera 110 may entail using the camera pipeline 451 in a cooperative manner with the display pipeline 458, as well as with an application that relays the current camera image 131 from the camera pipeline 451 and to the display pipeline 458 to enable the display 180 to be used for such aiming. Thus, as depicted, the camera scan application 351*cs* may include a UI component 351*ui* that so relays the current camera image 131 as part of communicating with the display pipeline 458 through the UI API that the display pipeline 458 provides.

As also previously discussed, such cooperative use of the camera pipeline 451 with at least a portion of the display pipeline 458 may also be relied upon to enable manual input to be received for the triggering the use of the camera 110 to capture a camera image 131. Again, at least the window manager 348 of the display pipeline 458 may be used together with the keypad driver 312 and/or the core libraries 332 to monitor the keypad 120 (and/or other input devices) for manual input that provides a command to operate the image capture component 113 of the camera 110 to capture a camera image 131.

Again, the camera pipeline 451 may include the camera 110, the camera buffer 161, the camera driver 311, the camera HAL 321, and the camera service 341. Again, the camera driver 311 may provide a camera driver interface for communications with the camera HAL 321, and the camera service 341 may provide a camera API to executable routines 140 at the level of the applications 250. Similar to the non-scan camera application 351*ns* of FIG. 4B, such applications as the camera scan application 351*cs* of FIG. 5A may be written specifically to use such a camera API to control operation of the camera 110, the light source 111 and/or the image capture component 113 to illuminate and/or capture camera image(s) 131 of encoded data markings within the FOV of the camera 110, and/or to store the camera image(s) 131 within the camera buffer 161. Accordingly, such applications as the camera scan application 351*cs* may not be written to use another API (e.g., a scan API) to perform such functions.

As further previously discussed, the camera pipeline 451 does not include a number of the components of the scan pipeline 457 that perform various processing functions to identify and decode encoded data markings. Thus, as depicted, the camera scan application 351*cs*, itself, must provide at least some of such functionality. Accordingly, as depicted, the camera scan application 351*cs* may include an ID component 351*i* for identifying portions of a camera image 131 at which an encoded data marking may be present. The camera scan application 351*cs* may also include a decoding component 351*d* to decode the data that is encoded within each such an identified encoded data marking, thereby retrieving the depicted decoded data 533. Applicant has observed that the implementations of such components as the ID component 351*i* and decoding component 351*d* within such camera scan applications 351*cs* tend to less capable than the implementations that are usually found within scan pipelines, such as the scan pipeline 457 introduced with FIGS. 4C-D. More specifically, such implementations within such camera scan applications 351*cs* tend to not be meant to recognize as wide array of encoded data marking types and/or formats, resulting in a lesser capability to either identify or decode more obscure varieties of encoded data markings.

However, even if the capabilities of the ID component 351*i* and decoding component 351*d* of the camera scan application 351*cs* fully matched their counterparts within the scan pipeline 457, the quality of the images of encoded data markings within the camera images 131 captured by the camera 110 do not match the quality of the images of encoded data markings within the scan images 137 captured by the scan engine 170. With the ability to provide illumination with monochromatic and/or collimated light, and/or with the ability to provide the scan component 173 with a sensitivity to a particular frequency or range of frequencies of light, the scan engine 170 may be capable of capturing a scan image 137 of an encoded data marking with better and/or more complete detail than a camera image 131 of the same encoded data marking that could be captured by the camera 110. Thus, a scan image 137 captured by the scan engine 170 may inherently include better per pixel brightness and/or color information for an encoded data marking, which then becomes better quality input data to the various processing functions used to identify and decode that encoded data marking.

Further, in embodiments in which the scan engine 170 includes the skew sensor 174, the scan engine 170 in such embodiments is able to provide an additional type of information (i.e., a degree of skew) that is simply not provided by the camera 110. Thus, an additional input is provided that enables the skew component 337*s* in such embodiments to generate a rectified image 530 from a scan image 137 where one or more encoded data markings are caused to become less distorted, thereby improving the functionality of other components involved in identifying and decoding encoded data markings.

Stated more succinctly, the scan engine 170, along with the various other components of the scan pipeline 457, are able to be more effective at capturing, identifying and decoding encoded data markings than the camera scan application 351*cs*.

FIGS. 5B and 5C, together, present views, somewhat similar to FIGS. 4C and 4D, of aspects of using the scan engine 170 to capture images of encoded data markings. However, whereas FIGS. 4C-D focus on using the scan pipeline 457 in the scan engine mode, FIGS. 5B-C focus on using the scan pipeline 457 in the virtual camera mode. More specifically, whereas FIGS. 4C-D focus on cooperation between the scan pipeline 457 and a portion of the display pipeline 458 to operate the scan engine 170 as a scan engine, FIGS. 5B-C focus on cooperation between the scan pipeline 457 and portions of both the camera pipeline 451 and the display pipeline 458 to operate the scan engine 170 as if it is a more conventional camera.

Again, in some embodiments, it may be that the scan pipeline 457 is able to be operated in either one of the scan engine mode and the virtual camera mode. Again, in the scan engine mode of FIGS. 4C-D, the scan pipeline 457 enables a scan engine application 351*se* (which is specifically written to use a scan engine) to operate the scan engine 170 as a scan engine. In the virtual camera mode of FIGS. 5B-C and 6, the scan pipeline 457 enables a camera scan application 351*cs* (which is specifically written to use a more conventional camera) to operate the scan engine 170 as if it is a more conventional camera. However, and again, in other embodiments, it may be that the scan pipeline 457 is able to be operated in just the virtual camera mode of FIGS. 5B-C and 6.

Focusing on FIG. 5B, and as previously discussed, to enable the needed cooperation among the pipelines 457, 451 and 458 to support using the scan pipeline 457 in the virtual camera mode, a registration process of the Android operating system may be performed to create a link between the camera HAL 321 and the virtual camera HAL 327, and/or to create another link between the camera service 341 and the scanner service 357. As will be explained in greater detail, through the link between the camera HAL 321 and the virtual camera HAL 327, the virtual camera HAL 327 may provide a camera driver interface similar to what is meant to be provided by the camera driver 311 as part of making the scan engine 170 accessible to the camera HAL 321 in a manner that enables the scan engine 170 to be used as if it is a more conventional camera. As will also be explained in greater detail, through the other link between the camera service 341 and the scanner service 357, additional control over the scan engine 170 may be provided to augment the control provided through the link between the camera HAL 321 and the virtual camera HAL 327.

As will be familiar to those skilled in the art, it may be that a user of the portable scanning device 1000 is provided with an opportunity, as part of such a registration process, to specify an association between the scan engine 170 and the camera scan application 315*cs*. In this way, the camera HAL 321 may be caused to automatically select the scan engine 170 as the particular camera that is to be used with the camera scan application 351*cs* whenever the camera scan application 351*cs* is selected by a user of the portable scanning device 1000 to be executed.

Focusing on FIG. 5C, again, the scan pipeline 457 may include the scan engine 170, the scan buffer 167, the virtual camera driver 317, the virtual camera HAL 327, the scan engine library 337, and/or the scanner service 357. Again, the virtual camera driver 317 may provide a scan engine driver interface for communications with the virtual camera HAL 327. And again, the scan engine library 337 may include the skew component 337*s*, the identification (ID) component 337*i*, the repair component 337*r*, and/or the decoding component 337*d*. As previously discussed, in various embodiments in which the scan pipeline 457 is able to be operated in the scan engine mode, as well as in the virtual camera mode, either the scan engine library 337 or the scanner service 357 may provide a scan API for use by applications that support the scan API (e.g., the scan engine application 351*se* of FIG. 4C), and by which such applications may receive either the decoded data 531 or the formatted data 532, respectively.

As also depicted, the virtual camera HAL 327 may include at least one component to perform various additional functions pertinent to the virtual camera mode. Such components may include an encoding component 327*e* within the virtual camera HAL 327. As will be explained shortly in greater detail, among such additional functions may the provision of one or more generated images 533 that may each include one or more new encoded data markings 534 based on the formatted data 532. Thus, in contrast to the provision of decoded data 531 or formatted data 532 to a scan engine application when the scan pipeline 457 is operated in the scan engine mode of FIGS. 4C-D, generated image(s) 533 may be provided to the camera HAL 351 of the camera pipeline 451 when the scan pipeline 457 is operated in the virtual camera mode of FIGS. 5C-D.

Returning to both FIGS. 5B-C, and beginning with the scan engine 170, an image of one or more encoded data markings at which the scan engine 170 is aimed may be captured by the scan component 173 thereof, and stored as a scan image 137 within the scan buffer 167. The scan image 137 may then be relayed through the virtual camera driver 317, the virtual camera HAL 327, and to the scan engine library 337. Within the scan engine library 337, each encoded data marking within the scan image 137 may be identified, repaired and/or decoded to thereby retrieve the depicted decoded data 531 from that encoded data marking(s) within the scan image 137.

Again, although the scan pipeline 457 may be capable of operating in a scan pipeline 457 in which a scan API is able to be provided to an application specifically written to use a scan API, the camera scan application 351*cs* is specifically written to use a camera API to interact with a more conventional camera (e.g., the camera 110). Accordingly, the camera scan application 351*cs* is not specifically written to so interact with a scan API. Thus, regardless of whether the scan pipeline 457 is able to provide the decoded data 531 through the scan API, the camera scan application 351*cs* does not use it.

Thus, as part of the scan pipeline 457 being used in the virtual camera mode, the decoded data 531 may be relayed from the scan engine library 337, and to both a formatting component 337*f* within the scanner service 357 and an encoding component 327*e* within the virtual camera HAL 327. The formatting component 357*f* and the encoding component 327*e* may cooperate to re-encode the decoded data 531 into one or more new encoded data markings 534, thereby generating one or more generated images 533 that provide image(s) of such new encoded data marking(s) 534. More specifically, each generated image 533 may be an image of just a single new encoded data marking 534 or multiple new encoded data markings 534 (e.g., an image with a clear, white, black or solid color background with just one or more new encoded data markings 534 depicted therein).

In some embodiments, the formatting component 357*f* and/or the encoding component 327*e* may be capable of being configured to specify various aspects of the new encoded data markings 534 to be generated, such as a particular type of encoded data marking, and/or particular formatting details for the data that is to be encoded therein. More specifically, in some of such embodiments, it may be that a user of the portable scanning device 1000 is provided with an opportunity to specify such type and/or format configuration settings at the time of registration where the scan engine 170 is caused to become selectable in a manner in which it is treated as a more conventional camera. Thus, in such embodiments, it may become possible to specify whether the new encoded data markings 534 are, for example, 1D barcodes, 2D barcodes, watermarks, or human-readable text; what standard and/or language for that specified type; what syntax for prefixes, suffixes, encodings, delimiters, punctuations, etc.

As will be familiar to those skilled in the art, different types of encoded data markings, and/or different formats for encoded data markings may be capable of accommodating different amounts of data (e.g., imposing differing limits on quantities of characters encoded, etc.), and/or may be capable of accommodating different quantities of distinct pieces of data (e.g., one type and/or format is able to support multiple pieces of data, while another is able support just one piece of data). As a result, situations may arise where the data that was able to be encoded within a single encoded data marking captured in a scan image 137 must be re-encoded into multiple new encoded data markings 534. By way of example, one type of encoded data marking (e.g., a 2D barcode) may be able to accommodate more characters of text data than another type of encoded data marking (e.g., a 1D barcode). Also by way of example, one format may employ a month-day-year format for dates, while another format may employ a day-month-year format for dates. Or, one format may employ little endian and/or unsigned encoding of the bits that specify an integer value, while another format may employ big endian and/or signed encoding of such bits. Or, one format may require no prefix or suffix characters flanking the characters of text data, while another may impose such requirement(s).

In some embodiments, the formatting component 357*f* and/or the encoding component 327*e* may be capable of being configured to specify various aspects of what is to be done when data that was originally encoded within a single encoded data marking must be re-encoded into multiple new encoded data markings 534. More specifically, the user may be allowed to specify whether the multiple new encoded data markings 534 into which data originally from a single encoded data marking is re-encoded are to all be placed within a single generated image 533, or are to each be placed within a separate generated image 533.

It should be noted that, given the likelihood that the abilities of the camera scan application 351*cs* to identify and decode encoded data markings may be somewhat limited in comparison to those abilities within the scan pipeline 457, the types of encoded data markings and/or formatting details selected for the new encoded data markings 534 to be generated may need to be selected to fit within those more limited capabilities. For example, it may be deemed advantageous to select more widely used types and/or formatting details, and/or it may be deemed advantageous to select to place each new encoded data marking 534 within its own separate generated image 533.

It should also be noted that, in some embodiments, it may be possible to specify different details for the formatting changes that are imposed on the decoded data 531 for when the scan pipeline 457 is operated in the scan engine mode versus when the scan pipeline 457 is operated in the virtual camera mode. In this way, separate formatting details may be specified for formatting that may be employed for scan engine applications (e.g., the scan engine application 351*se* of FIG. 4C), and for formatting that may be employed for camera scan applications (e.g., the camera scan application 351*cs* of FIG. 5B).

Regardless of the exact manner in which such configuration of the formatting component 357*f* is performed for the virtual camera mode, upon receipt of the decoded data 531, the decoded data 531 may be reformatted by the formatting component 357*f* to generate a corresponding formatted data 532 with particular formatting details that are suited for the generation of the particular type of the new encoded data markings 534 that have been specified. Also, regardless of the exact manner in which such configuration of the encoding component 372*e* is performed, upon receipt of the formatted data 532, the formatted data 532 may be used by the encoding component 327*e* to generate corresponding one or more new encoded data markings 534 within corresponding one or more generated images 533.

Following the generation of those generated image(s) 533, the virtual camera HAL 327 may then provide the generated image(s) 533 to the camera HAL 321 within the camera pipeline 451. Again, this provision may be through the link formed thereby by the registration process, and that link may employ a camera driver interface as part of making the scan engine 170 accessible in a manner that is as if the scan engine 170 is a more conventional camera.

In turn, within the camera pipeline 451 and as previously discussed: 1) the one or more generated images 533 may be relayed to the camera scan application 351*cs* from the camera HAL 321 and through the camera service 341. Further, such relaying to the camera scan application 351*cs* may be through the same camera API that would be used if a more conventional camera (e.g., the camera 110) were used. In this way, the camera pipeline 451 is able to be used without modification by providing it with the generated image(s) 533 of new encoded data marking(s) 534 as if those images were camera images of encoded data markings captured by a more conventional camera.

Accordingly, within the camera scan application 351*cs*, those generated image(s) 533 of new encoded data markings 534 are used as an input to previously described processing operations performed using the ID component 351*i* and the decoding component 351*d* of the camera scan application 351cs to retrieve the depicted decoded data 534 therefrom. Thus, the skew component 337s, the ID component 337i, the repair component 337r, the decoding component 337d, the formatting component 357f and the encoding component 327e cooperate to perform various preprocessing operations on the scan images 137 and on the encoded data marking(s) within each scan image 137 to generate new encoded data markings 534 within corresponding generated images 533 that are easier for the camera scan application 351cs to use as input. In this way, the camera scan application 351cs is also able to be used without modification by providing it with the generated image(s) 533 of new encoded data marking(s) 534 as if those images were camera images of encoded data markings captured by a more conventional camera.

As depicted, the UI component 351ui may relay the generated images 533 to the display pipeline 458 to be visually presented on the display 180. As previously discussed, such relaying of images received through a camera API (as if those images are being received from a camera) may be performed to provide images for use as an aid to aiming a camera. However, as also previously discussed, the use of the scan engine 170 with its aiming component 172 renders such use of the display 180 unnecessary. Also, since the generated images 533 are images of new encoded data markings 534 from the aforedescribed re-encoding of decoded data, they are of no use in aiming any camera of the portable scanning device 1000.

As also previously discussed, and regardless of whether the display 180 is used, the cooperative use of the camera pipeline 451 with at least a portion of the display pipeline 458 may also be relied upon to enable manual input to be received for the triggering the use of the scan engine 170 to capture a scan image 137. Again, at least the window manager 348 of the display pipeline 458 may be used together with the keypad driver 312 and/or the core libraries 332 to monitor the keypad 120 (and/or other input devices) for manual input that provides a command to operate the scan component 173 of the scan engine 170 to capture a scan image 137. Additionally, the other link that is formed at registration between the camera service 341 and the scanner service 357 may be used to trigger the activation of one or more particular components of the scan engine 170 (e.g., the aiming component 172), and/or one or more particular components of the scanner service 357, the scan engine library 337, the virtual camera HAL 327, and/or the virtual camera driver 317.

FIG. 6 depicts aspects of an alternative embodiment (i.e., an alternative to the embodiment of FIGS. 5B-C) of using the scan pipeline 457 in the virtual camera mode together with at least a portion of the camera pipeline 451 and at least a portion of the display pipeline 458 to enable the scan engine 170 to be used as if it is a more conventional camera to capture an image of an encoded data marking. Although not specifically depicted in FIG. 6, like the embodiment of FIGS. 5B-C, a registration process has been performed to couple the virtual camera HAL 327 of the scan pipeline 457 to the camera HAL 321 of the camera pipeline 451. Thus, just as was the case in the embodiment of FIG. 5B-C, the virtual camera HAL 327 generates imagery intended to be provided to the camera HAL 321, and therethrough to the camera scan application 351cs.

However, unlike the imagery generated by the virtual camera HAL 327 of FIGS. 5B-C, the imagery generated within the virtual camera HAL 327 of FIG. 6 is a combination of a scan image 137 overlain by one or more of the new encoded data markings 534 generated within the scanner service 357. More specifically, the virtual camera HAL 327 may additionally include a merging component 327m. The locations of encoded data marking(s) that are identified by the ID component 337i within a scan image 137 captured by the scan engine 170 may be relayed to the merging component 327m and used to guide the merging component 327m concerning where to place overlays of corresponding new encoded data markings 534. As a result, within the scan image 137, each original encoded data marking therein is replaced with a new encoded data marking 534 that encodes the same data, but in a type of new encoded data marking with formatting that is generated to be more easily decoded by the camera scan application 351cs. The result is effectively a modified version of the scan image 137 with such a more easily decoded new encoded data marking 534.

Following the generation of such a modified version of the scan image 137, the modified scan image 137 is relayed from the virtual camera HAL 327, and through the camera pipeline 451 to the scan application 351cs. In this way, the camera pipeline 451 is able to be used without modification by providing it with the modified scan image 137 of new encoded data marking(s) as if that images was a camera image of encoded data marking(s) captured by a more conventional camera.

Upon receiving the modified scan image 137, the camera scan application 351cs decodes the new encoded data marking 534 therein. Thus, the skew component 337s, the ID component 337i, the repair component 337r, the decoding component 337d, the formatting component 357f, the encoding component 327e and the merging component 327m cooperate to perform various preprocessing operations on the scan images 137 and on the encoded data marking(s) within each scan image 137 to generate new encoded data markings within corresponding modified scan images 137 that are easier for the camera scan application 351cs to use as input. In this way, the camera scan application 351cs is also able to be used without modification by providing it with the modified scan image 137 of new encoded data marking(s) as if that image was a camera image of encoded data marking(s) captured by a more conventional camera.

The camera scan application 351cs also relays the modified scan image 137 to the display pipeline 458 to be visually presented on the display 180. Since the modified scan image 137 includes at least a portion of the original scan image 137, but with the new encoded data marking 534 overlain onto it, the modified scan image 137 can still be used on the display 180 to aim the scan engine 170 towards a particular encoded data marking for being captured without using the aiming component 172 of the scan engine 170.

Figure 7A:
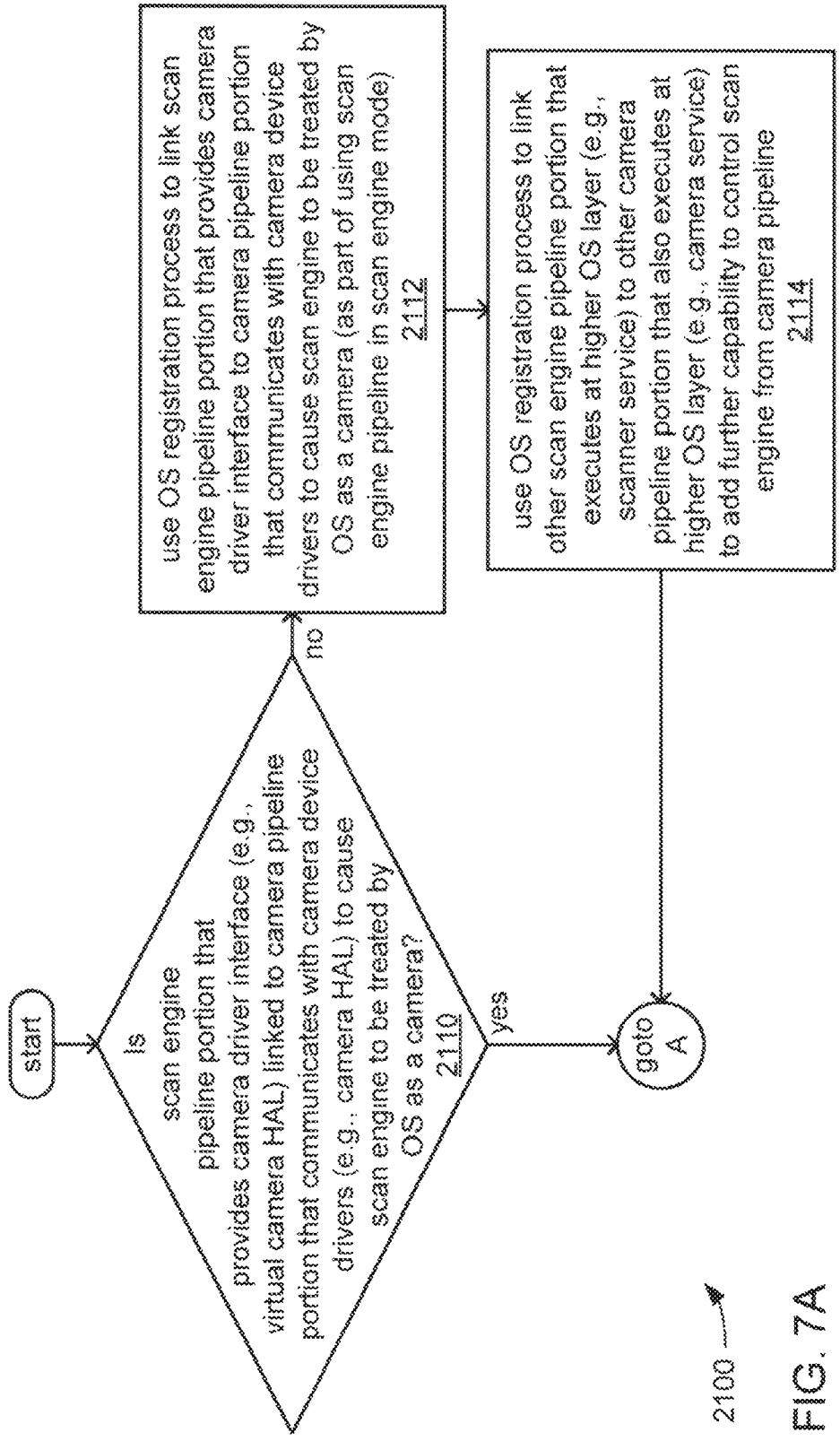

FIGS. 7A-B, taken together, depict a flow chart of aspects of preparation of the portable scanning device 1000 for use to scan and decode encoded data markings.

At 2110, processor(s) of a portable scanning device (e.g., the processor(s) 150 of the portable scanning device 1000) may be caused by the commencement of execution of a camera scan application (e.g., the camera scan application 351cs) by the processors, or by changes to settings of the portable scanning device, to check whether a scan engine pipeline portion that provides a camera driver interface (e.g., the virtual camera HAL 327 of the scan engine pipeline 457) is linked to a camera pipeline portion (e.g., the camera HAL 321 of the camera pipeline 451) to cause a scan engine pipeline to be used in a virtual camera mode to cause the scan engine of the scan engine pipeline (e.g., the scan engine 170) to be treated by an OS of the scanning device as a more conventional camera (e.g., like the camera 110).

If so at 2110, then at 2120, the processor(s) may be caused to check whether camera scan application is configured to be associated with a more conventional camera of the camera pipeline, or to be associated with the scan engine in a manner in which the scan engine is used as a camera.

However, if not at 2110, then at 2112, the processor(s) may be caused to use registration process supported by the OS to form the link between the scan engine pipeline portion that provides the camera driver interface (e.g., the virtual camera HAL 327 of the scan pipeline 457) and the camera pipeline portion that communicates with camera device drivers (e.g., the camera HAL 321 of the camera pipeline 451) to cause the scan engine of the scan engine pipeline (e.g., the scan engine 170) to be treated by the OS as if it is a more conventional camera. Also, at 2114, the processor(s) may be caused to further use the registration process to form another link between another scan engine pipeline portion that executes at a higher OS layer (e.g., the framework 240 and/or the applications 250) and another camera pipeline portion that also executes at a higher OS layer to add further capability to control the scan engine from the camera pipeline. Then, at 2120, the processor(s) may be caused to check whether camera scan application is configured to be associated with a conventional camera of the portable scanning device, or to be associated with the scan engine in a manner in which the scan engine is used as a camera.

At 2120, if the camera scan application has not been configured to be associated with either a camera or scan engine, then at 2122, the processor(s) may be caused to present a prompt to a user of the portable scanning device to select either a camera to be associated with the camera scan application, or the scan engine to be associated with the camera scan application (which would cause the scan engine to be used as if it is a camera). At 2130, if the user answers the prompt by selecting the scan engine, then at 2132, the processor(s) may present another prompt to the user to select a type and/or formatting details for generating new encoded data markings that are to be output in generated images to the camera pipeline for being relayed to the camera scan application. At 2134, the processor(s) may present a further prompt to the user to select whether each new encoded data marking is to be generated within its own separate generated image, or to allow multiple ones of the new encoded data markings to be generated within a single generated image.

Figure 8A:
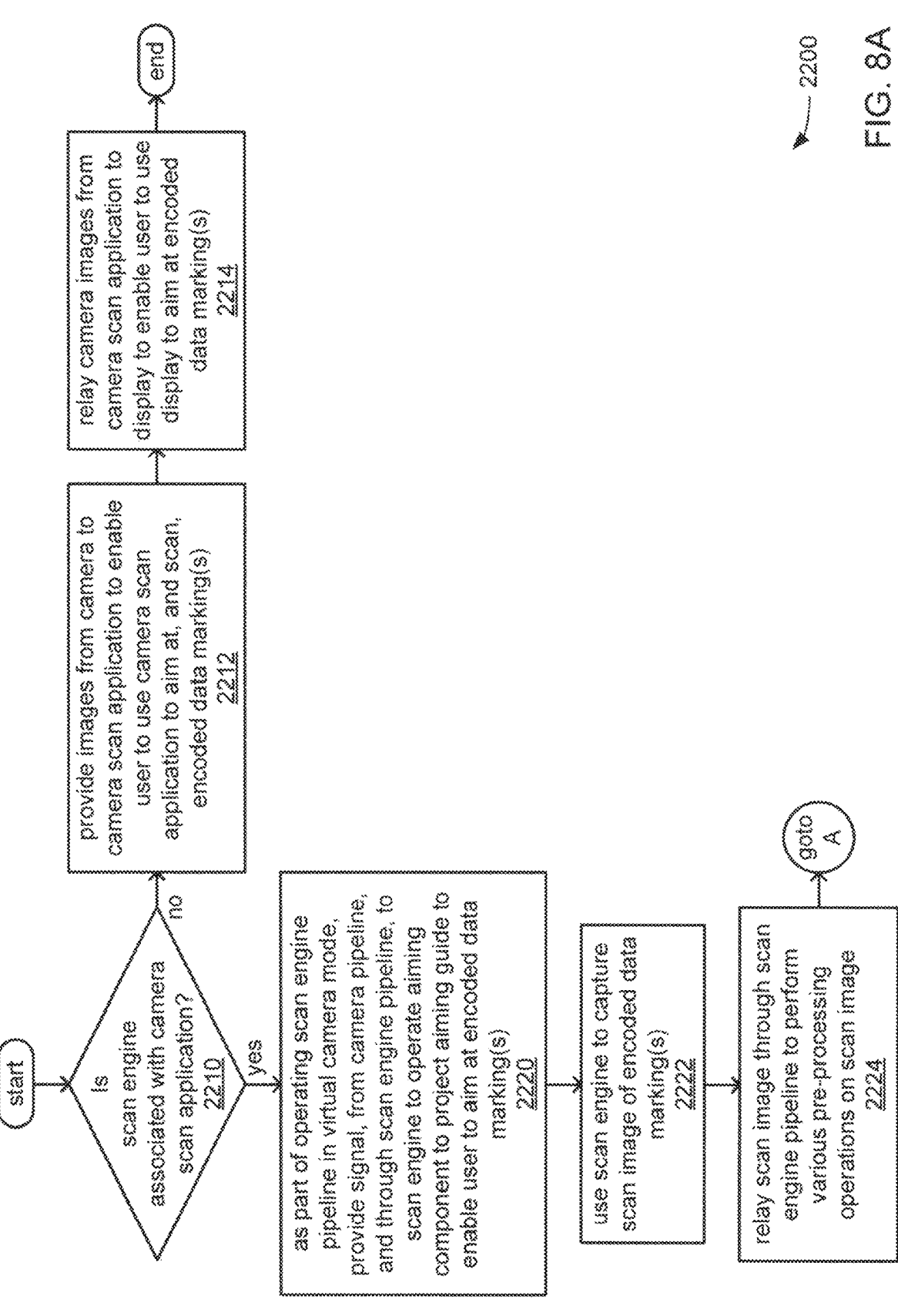

FIGS. 8A-B, taken together, depict a flow chart of aspects of use of the portable scanning device 1000 to scan and decode encoded data markings.

At 2210, processor(s) of a portable scanning device (e.g., the processor(s) 150 of the portable scanning device 1000) may be caused by the commencement of execution of a camera scan application by the processor(s) (e.g., the camera scan application 351_cs_) to check whether a scan engine of the portable scanning device (e.g., the scan engine 170) is associated with the camera scan application such that it is to be treated as a camera for use by the camera scan application in capturing images of encoded data markings.

If not at 2210, then at 2212, the processor(s) may be caused to proceed with providing images from a more conventional camera of the portable scanning device (e.g., the camera 110) and to the camera scan application to enable a user of the portable scanning device to be able to use such images as presented on a display of the portable scanning device (e.g., the display 180) to facilitate use of the display to aim at encoded data markings for being scanned with the camera for decoding. At 2214, the processor(s) may be caused to actually perform such relaying of the images from the camera scan application and to the display to enable such use of the display for aiming.

However, if so at 2210, then at 2220, and as part of operating the scan engine pipeline of the scan engine in a virtual camera mode, the processor(s) may provide a signal to the scan engine to operate its aiming component (e.g., the aiming component 172) to project a visual aiming guide to facilitate aiming at encoded data markings.

At 2222, the processor(s) may be caused to operate the scan engine to capture a scan image of encoded data marking(s) (e.g., the scan image 137). At 2224, the processor(s) may be caused to relay the scan image through the scan engine pipeline to cause various pre-processing operations the be performed on the scan image.

At 2230, and as previously discussed, in some embodiments, the scan engine may include (or be otherwise accompanied by) a skew sensor (e.g., the skew sensor 124). In such embodiments, the capture of the scan image may include also detecting a degree of skew in the scan image between the plane of a surface that may carry an encoded data marking and the plane of the scan engine, and the scan image may incorporate or be accompanied by an indication of the degree of skew. In such embodiments, and among the pre-processing operations, the processor(s) may be caused to use such a skew indication to de-skew at least one encoded data marking (i.e., at least mitigate the degree of skew), thereby generating a rectified image (e.g., the rectified image 530).

At 2232, and among the pre-processing operations, the processor(s) may be caused to identify encoded data marking(s) in the scan image (or in the rectified image in embodiments that in which the rectified image is generated). More specifically, and as previously discussed, the processor(s) may be caused to identify one or more regions within the scan image at which adjacent pixels have characteristics consistent with an encoded data marking being located thereat.

At 2234, and among the pre-processing operations, the processor(s) may be caused to repair and/or decode each identified encoded data marking to retrieve data encoded within each as decoded data (e.g., the decoded data 531).

At 2236, and among the pre-processing operations, the processor(s) may be caused, for each piece of decoded data, to format and encode (re-encode) it to generate one or more new encoded data markings (e.g., the new encoded data markings 534). In so doing, as previously discussed, and depending on configuration settings regarding the generation of new encoded data markings, the processor(s) may be caused to generate each new encoded data marking within a separate generated image (e.g., the generated image(s) 533), or may be caused to generate multiple ones of the new encoded data markings within a single generated image (e.g., where multiple new encoded data markings encode parts of the same decoded data from a single original encoded data marking in a single original scan image).

At 2240, and following the pre-processing operations discussed above, the processor(s) may be caused to provide the resulting generated image(s) from the scan engine pipeline, and to the camera scan application. More specifically, the processor(s) may convey the generated image(s) from a portion of the scan engine pipeline that provides a camera driver interface (e.g., the virtual camera HAL 327) and to a portion of a camera pipeline (e.g., the camera pipeline 451) of the portable scanning device that communicates with camera drivers (e.g., the camera HAL 321). As previously discussed, the provision of a camera driver interface by the scan engine pipeline portion mimics how images would otherwise normally be provided to the camera pipeline portion from a more conventional camera through a camera driver (e.g., from the camera 110 through the camera driver 311). In this way, the camera pipeline is able to be used to convey scan images captured by the scan engine, and to the camera scan application, without modification to the camera pipeline.

At 2242, the processor(s) may be caused to so relay the generated image(s) from the camera pipeline portion, and to the camera scan application through another portion of the camera pipeline that provides a camera API (e.g., the camera service 341). As previously discussed, the provision of a camera API by the other camera pipeline portion mimics how images would otherwise normally be provided to the camera scan application from the camera pipeline. In this way, the camera scan application is able to be used with the scan engine and the scan engine pipeline without modification to the camera scan application.

At 2250, and within the camera scan application, the processor(s) may be caused to identify the new encoded data marking(s) within the generated image(s).

At 2252, and within the camera scan application, the processor(s) may be caused to decode the identified new encoded data marking(s) to retrieve the data encoded therein.

There is thus disclosed a decoding system in which hardware and software components of a scan pipeline are caused to work with a camera scan application that is not intended to work with such a pipeline.

A decoding device includes a scan engine configured to capture a scan image of a first encoded data marking, wherein the scan engine is associated with a scan engine pipeline; and storage configured to store at least one of the scan image, a camera scan application configured to use a camera through a camera applications programming interface (API) to capture a camera image, at least one executable routine of a camera pipeline, and at least one executable routine of the scan engine pipeline. The decoding device also includes a processor communicatively coupled to the storage and to the scan engine, the processor configured to perform operations including: in executing instructions of the at least one executable routine of the scan engine pipeline, perform pre-processing operations including decode the first encoded data marking within the scan image to retrieve first data encoded in the first encoded data marking, and encode the first data in at least one new encoded data marking within at least one generated image; in executing instructions of the at least one executable routine of the scan engine pipeline, provide the at least one generated image to the at least one executable routine of the camera pipeline through a first camera driver interface of a first link formed between the scan engine pipeline and the camera pipeline, wherein characteristics of the first camera driver interface mimic characteristics of a second camera driver interface of a camera driver; in executing instructions of the at least one executable routine of the camera pipeline, relay the at least one generated image to the camera scan application through the camera API; and in executing instructions of the camera scan application, decode the at least one new encoded data marking within the at least one generated image to retrieve the first data.

The decoding device may further include the camera and a display; the processor may be communicatively coupled to the camera; and the processor may be communicatively coupled to the display. The processor, in response to commencement of execution of instructions of the camera scan application, may be further configured to perform operations including: retrieve stored configuration data that includes an indication of whether the camera scan application is associated with the camera or the scan engine; and in response to the camera scan application being indicated as being associated with the scan engine, provide a command to an aiming component associated with the scan engine to project a visual aiming guide onto a surface of an object within a field of view (FOV) of the scan engine.

The at least one executable routine of the scan engine pipeline may include a scanner service; the at least one executable routine of the camera pipeline may include a camera service that provides the camera API to the camera scan application; and the scanner service, the camera service and the camera scan application may be executed by the processor within an architecture of an operating system. Providing the command to the aiming component associated with the scan engine may include the processor being configured to perform operations including: use a registration process of the operating system to form a second link between the scanner service and the camera service; relay the command from the camera service, and to the scanner service; and within the scan engine pipeline, relay the command through the scan engine pipeline from the scanner service, and to the aiming component.

The at least one executable routine of the scan engine pipeline may include a virtual camera HAL configured to provide the first camera driver interface; the at least one executable routine of the camera pipeline may include a camera HAL configured to communicate with the camera driver through the second camera driver interface; and the virtual camera HAL, the camera HAL and the camera scan application may include executed by the processor within an architecture of an operating system. Providing the at least one generated image to the at least one executable routine of the camera pipeline may include the processor being configured to perform operations including: use a registration process of the operating system to form the first link between the virtual camera HAL and the camera HAL; and relay the at least one generated image from the virtual camera HAL, and to the camera HAL, with the characteristics of the first camera driver interface to present the scan engine to the camera HAL as if the scan engine is the camera.

The decoding device may further include the camera, wherein: the processor may be communicatively coupled to the camera; and the at least one executable routine of the camera pipeline may include the camera driver, wherein the camera driver may be configured to provide the second camera driver interface. The processor, in response to commencement of execution of instructions of the camera scan application, may be further configured to perform operations including: retrieve stored configuration data that includes an indication of whether the camera scan application is associated with the camera or the scan engine; condition communications between the camera HAL and the virtual camera HAL through the first camera driver interface, and the performance of at least the pre-processing operations on whether the camera scan application is indicated in the stored configuration data as being associated with scan engine; and condition communications between the camera HAL and the camera driver through the second camera driver interface on whether the camera scan application is indicated in the stored configuration data as being associated with the camera.

The scan engine may include a skew sensor configured to detect a degree of skew of a plane of a surface of an object that carries the first encoded data marking relative to a plane of the scan engine; the at least one executable routine of the scan engine pipeline may include a skew component configured to mitigate the degree of skew; and the processor may be configured to perform further pre-processing operations including, use the indication of the degree of skew to mitigate the degree of skew of the first encoded data marking to generate a rectified image of the first encoded data marking prior to the decoding of the first encoded data marking.

The at least one executable routine of the scan engine pipeline may include a repair component configured to repair damage to, or obscuring of, the first encoded data marking; the first encoded data marking may be damaged or obscured such that a portion of the first encoded data marking is not visible; and the processor may be configured to perform a further pre-processing operation including repair the first encoded data marking to make the portion of the first encoded data marking visible to improve accuracy in decoding the first encoded data marking.

The first encoded data marking and the at least one new encoded data marking may employ differing formats for the first data; and the generation of the at least one new encoded data marking may include a conversion of the first data from a first format in which the first data is encoded in the first encoded data marking, and to a second format in which the first data is encoded in the at least one new encoded data marking. A difference between the first format and the second format may include at least one of: a bit width; an ordering of bytes; a delimiter; a prefix; or a suffix.

The first format may be able to encode more data bits than and the second format; the first data may include a quantity of data bits that enables the first data to be encoded entirely within a maximum bit quantity of the first format of the first encoded data marking; and the first data may include a quantity of data bits that does not enable the first data to be encoded entirely within a maximum bit quantity of the second format of a single encoded data marking of the at least one new encoded data marking. The processor may be configured to perform further pre-processing operations including: compare the quantity of data bits of the first data to the maximum bit quantity of the second format; in response to the quantity of data bits of the first data exceeding the maximum bit quantity of the second format, split the first data into multiple portions, and encode each portion of the multiple portions within a separate new encoded data marking of the at least one new encoded data marking; retrieve stored configuration data that includes an indication of whether multiple new encoded data markings are permitted to be included within a single generated image of the at least one generated image; in response to an indication that multiple new encoded data markings are permitted to be included within a single generated image, generate multiple ones of the separate new encoded data markings within a single generated image of the at least one generated image; and in response to an indication that multiple new encoded data markings are not permitted to be included within the single generated image, generate each separate new encoded data marking within a separate generated image of the at least one generated image.

The scan image may include a second encoded data marking in addition to the first encoded data marking, and the processor may be configured to perform further pre-processing operations including: decode the second encoded data marking within the scan image to retrieve second data encoded in the second data marking; retrieve stored configuration data that includes an indication of whether multiple new encoded data markings are permitted to be included within a single generated image of the at least one generated image; in response to an indication that multiple new encoded data markings are permitted to be included within a single generated image, encode the first data in a first new data marking of the at least one new data marking within the single generated image of the at least one generated image, and encode the second data in a second new data marking of the at least one new data marking within the single generated image; and in response to an indication that multiple new encoded data markings are not permitted to be included within the single generated image, encode the first data in the first new data marking within a first generated image of the at least one generated image, and encode the second data in the second new data marking within a second generated image of the at least one generated image.

A method includes, in executing, by a processor of a decoding device, instructions of at least one executable routine of a scan engine pipeline of the decoding device, performing pre-processing operations including: decoding, by the processor, a first encoded data marking within a scan image captured by a scan engine of the decoding device to retrieve first data encoded in the first encoded data marking; and encoding, by the processor, the first data in at least one new encoded data marking within at least one generated image. The method further includes: in executing, by the processor, instructions of the at least one executable routine of the scan engine pipeline, providing the at least one generated image to at least one executable routine of a camera pipeline of the decoding device through a first camera driver interface of a first link formed between the scan engine pipeline and the camera pipeline, wherein characteristics of the first camera driver interface mimic characteristics of a second camera driver interface of a camera driver; in executing, by the processor, instructions of at least one executable routine of the camera pipeline, relaying the at least one generated image to a camera scan application of the decoding device through a camera applications programming interface (API), wherein the camera scan application is configured to use a camera through the camera API; and in executing, by the processor, instructions of the camera scan application, decoding the at least one new encoded data marking within the at least one generated image to retrieve the first data.

The method may further include, in response to commencement of execution of instructions of the camera scan application by the processor, performing operations including: retrieving, by the processor, stored configuration data that includes an indication of whether the camera scan application is associated with the camera or the scan engine; and in response to the camera scan application being indicated as being associated with the scan engine, providing, by the processor, a command to an aiming component associated with the scan engine to project a visual aiming guide onto a surface of an object within a field of view (FOV) of the scan engine.

The at least one executable routine of the scan engine pipeline may include a scanner service; the at least one executable routine of the camera pipeline may include a camera service that provides the camera API to the camera scan application; and the scanner service, the camera service and the camera scan application may be executed by the processor within an architecture of an operating system. Providing the command to the aiming component associated with the scan engine may include performing operations including: using, by the processor, a registration process of the operating system to form a second link between the scanner service and the camera service; relaying, by the processor, the command from the camera service, and to the scanner service; and within the scan engine pipeline, relaying, by the processor, the command through the scan engine pipeline from the scanner service, and to the aiming component.

The at least one executable routine of the scan engine pipeline may include a virtual camera HAL configured to provide the first camera driver interface; the at least one executable routine of the camera pipeline may include a camera HAL configured to communicate with the camera driver through the second camera driver interface; and the virtual camera HAL, the camera HAL and the camera scan application may be executed by the processor within an architecture of an operating system. Providing the at least one generated image to the at least one executable routine of the camera pipeline may include performing operations including: using, by the processor, a registration process of the operating system to form the first link between the virtual camera HAL and the camera HAL; and relaying, by the processor, the at least one generated image from the virtual camera HAL, and to the camera HAL, with the characteristics of the first camera driver interface to present the scan engine to the camera HAL as if the scan engine is the camera.

The at least one executable routine of the camera pipeline may include the camera driver, wherein the camera driver may be configured to provide the second camera driver interface. The method may further include, in response to commencement of execution of instructions of the camera scan application by the processor, performing operations including: retrieving, by the processor, stored configuration data that includes an indication of whether the camera scan application is associated with the camera or the scan engine; conditioning, by the processor, communications between the camera HAL and the virtual camera HAL through the first camera driver interface, and the performance of at least the pre-processing operations on whether the camera scan application is indicated in the stored configuration data as being associated with scan engine; and conditioning, by the processor, communications between the camera HAL and the camera driver through the second camera driver interface on whether the camera scan application is indicated in the stored configuration data as being associated with the camera.

The scan engine may include a skew sensor configured to detect a degree of skew of a plane of a surface of an object that carries the first encoded data marking relative to a plane of the scan engine; and the at least one executable routine of the scan engine pipeline may include a skew component configured to mitigate the degree of skew. The method may further include performing further pre-processing operations including using, by the processor, the indication of the degree of skew to mitigate the degree of skew of the first encoded data marking to generate a rectified image of the first encoded data marking prior to the decoding of the first encoded data marking.

The at least one executable routine of the scan engine pipeline may include a repair component configured to repair damage to, or obscuring of, the first encoded data marking; and the first encoded data marking may be damaged or obscured such that a portion of the first encoded data marking is not visible. The method may further include performing a further pre-processing operation including repairing, by the processor, the first encoded data marking to make the portion of the first encoded data marking visible to improve accuracy in decoding the first encoded data marking.

The first encoded data marking and the at least one new encoded data marking may employ differing formats for the first data; and the generation of the at least one new encoded data marking may include a conversion of the first data from a first format in which the first data is encoded in the first encoded data marking, and to a second format in which the first data is encoded in the at least one new encoded data marking. A difference between the first format and the second format may include at least one of: a bit width; an ordering of bytes; a delimiter; a prefix; or a suffix.

The first format may be able to encode more data bits than and the second format; the first data may include a quantity of data bits that enables the first data to be encoded entirely within a maximum bit quantity of the first format of the first encoded data marking; and the first data may include a quantity of data bits that does not enable the first data to be encoded entirely within a maximum bit quantity of the second format of a single encoded data marking of the at least one new encoded data marking. The method may further include performing further pre-processing operations comprising: comparing, by the processor, the quantity of data bits of the first data to the maximum bit quantity of the second format; in response to the quantity of data bits of the first data exceeding the maximum bit quantity of the second format, splitting, by the processor, the first data into multiple portions, and encoding, by the processor, each portion of the multiple portions within a separate new encoded data marking of the at least one new encoded data marking; retrieving, by the processor, stored configuration data that includes an indication of whether multiple new encoded data markings are permitted to be included within a single generated image of the at least one generated image; in response to an indication that multiple new encoded data markings are permitted to be included within a single generated image, generating, by the processor, multiple ones of the separate new encoded data markings within a single generated image of the at least one generated image; and in response to an indication that multiple new encoded data markings are not permitted to be included within the single generated image, generating, by the processor, each separate new encoded data marking within a separate generated image of the at least one generated image.

The scan image may include a second encoded data marking in addition to the first encoded data marking, and the method may further include performing further pre-processing operations including: decoding, by the processor, the second encoded data marking within the scan image to retrieve second data encoded in the second data marking; retrieving, by the processor, stored configuration data that includes an indication of whether multiple new encoded data markings are permitted to be included within a single generated image of the at least one generated image; in response to an indication that multiple new encoded data markings are permitted to be included within a single generated image, encoding, by the processor, the first data in a first new data marking of the at least one new data marking within the single generated image of the at least one generated image, and encoding, by the processor, the second data in a second new data marking of the at least one new data marking within the single generated image; and in response to an indication that multiple new encoded data markings are not permitted to be included within the single generated image, encoding, by the processor, the first data in the first new data marking within a first generated image of the at least one generated image, and encoding, by the processor, the second data in the second new data marking within a second generated image of the at least one generated image.

The invention claimed is:

1. A decoding device comprising:

a scan engine configured to capture a scan image of a first encoded data marking, wherein the scan engine is associated with a scan engine pipeline;

storage configured to store at least one of the scan image, a camera scan application configured to use a camera through a camera applications programming interface (API) to capture a camera image, at least one executable routine of a camera pipeline, and at least one executable routine of the scan engine pipeline; and a processor communicatively coupled to the storage and to the scan engine, the processor configured to perform operations comprising:

in executing instructions of the at least one executable routine of the scan engine pipeline, perform pre-processing operations comprising decode the first encoded data marking within the scan image to retrieve first data encoded in the first encoded data marking, and encode the first data in at least one new encoded data marking within at least one generated image;

in executing instructions of the at least one executable routine of the scan engine pipeline, provide the at least one generated image to the at least one executable routine of the camera pipeline through a first camera driver interface of a first link formed between the scan engine pipeline and the camera pipeline, wherein characteristics of the first camera driver interface mimic characteristics of a second camera driver interface of a camera driver;

in executing instructions of the at least one executable routine of the camera pipeline, relay the at least one generated image to the camera scan application through the camera API; and in executing instructions of the camera scan application, decode the at least one new encoded data marking within the at least one generated image to retrieve the first data.

2. The decoding device of claim 1, further comprising the camera and a display, wherein:

the processor is communicatively coupled to the camera;

the processor is communicatively coupled to the display; and the processor, in response to commencement of execution of instructions of the camera scan application, is further configured to perform operations comprising:

retrieve stored configuration data that includes an indication of whether the camera scan application is associated with the camera or the scan engine; and in response to the camera scan application being indicated as being associated with the scan engine, provide a command to an aiming component associated with the scan engine to project a visual aiming guide onto a surface of an object within a field of view (FOV) of the scan engine.

3. The decoding device of claim 2, wherein:

the at least one executable routine of the scan engine pipeline comprises a scanner service;

the at least one executable routine of the camera pipeline comprises a camera service that provides the camera API to the camera scan application;

the scanner service, the camera service and the camera scan application are executed by the processor within an architecture of an operating system; and providing the command to the aiming component associated with the scan engine comprises the processor being configured to perform operations comprising:

use a registration process of the operating system to form a second link between the scanner service and the camera service;

relay the command from the camera service, and to the scanner service; and within the scan engine pipeline, relay the command through the scan engine pipeline from the scanner service, and to the aiming component.

4. The decoding device of claim 1, wherein:

the at least one executable routine of the scan engine pipeline comprises a virtual camera HAL configured to provide the first camera driver interface;

the at least one executable routine of the camera pipeline comprises a camera HAL configured to communicate with the camera driver through the second camera driver interface;

the virtual camera HAL, the camera HAL and the camera scan application are executed by the processor within an architecture of an operating system; and providing the at least one generated image to the at least one executable routine of the camera pipeline comprises the processor being configured to perform operations comprising:

use a registration process of the operating system to form the first link between the virtual camera HAL and the camera HAL; and relay the at least one generated image from the virtual camera HAL, and to the camera HAL, with the characteristics of the first camera driver interface to present the scan engine to the camera HAL as if the scan engine is the camera.

5. The decoding device of claim 4, further comprising the camera, wherein:

the processor is communicatively coupled to the camera;

the at least one executable routine of the camera pipeline comprises the camera driver, wherein the camera driver is configured to provide the second camera driver interface; and the processor, in response to commencement of execution of instructions of the camera scan application, is further configured to perform operations comprising:

retrieve stored configuration data that includes an indication of whether the camera scan application is associated with the camera or the scan engine;

condition communications between the camera HAL and the virtual camera HAL through the first camera driver interface, and the performance of at least the pre-processing operations on whether the camera scan application is indicated in the stored configuration data as being associated with scan engine; and condition communications between the camera HAL and the camera driver through the second camera driver interface on whether the camera scan application is indicated in the stored configuration data as being associated with the camera.

6. The decoding device of claim 1, wherein:

the scan engine comprises a skew sensor configured to detect a degree of skew of a plane of a surface of an object that carries the first encoded data marking relative to a plane of the scan engine;

the at least one executable routine of the scan engine pipeline comprises a skew component configured to mitigate the degree of skew; and the processor is configured to perform further pre-processing operations comprising, use the indication of the degree of skew to mitigate the degree of skew of the first encoded data marking to generate a rectified image of the first encoded data marking prior to the decoding of the first encoded data marking.

7. The decoding device of claim 1, wherein:

the at least one executable routine of the scan engine pipeline comprises a repair component configured to repair damage to, or obscuring of, the first encoded data marking;

the first encoded data marking is damaged or obscured such that a portion of the first encoded data marking is not visible; and the processor is configured to perform a further pre-processing operation comprising repair the first encoded data marking to make the portion of the first encoded data marking visible to improve accuracy in decoding the first encoded data marking.

8. The decoding device of claim 1, wherein:

the first encoded data marking and the at least one new encoded data marking employ differing formats for the first data;

the generation of the at least one new encoded data marking comprises a conversion of the first data from a first format in which the first data is encoded in the first encoded data marking, and to a second format in which the first data is encoded in the at least one new encoded data marking; and a difference between the first format and the second format comprises at least one of:

a bit width;

an ordering of bytes;

a delimiter;

a prefix; or a suffix.

9. The decoding device of claim 8, wherein:

the first format is able to encode more data bits than and the second format;

the first data comprises a quantity of data bits that enables the first data to be encoded entirely within a maximum bit quantity of the first format of the first encoded data marking;

the first data comprises a quantity of data bits that does not enable the first data to be encoded entirely within a maximum bit quantity of the second format of a single encoded data marking of the at least one new encoded data marking; and the processor is configured to perform further pre-processing operations comprising:

compare the quantity of data bits of the first data to the maximum bit quantity of the second format;

in response to the quantity of data bits of the first data exceeding the maximum bit quantity of the second format, split the first data into multiple portions, and encode each portion of the multiple portions within a separate new encoded data marking of the at least one new encoded data marking;

retrieve stored configuration data that includes an indication of whether multiple new encoded data markings are permitted to be included within a single generated image of the at least one generated image;

in response to an indication that multiple new encoded data markings are permitted to be included within a single generated image, generate multiple ones of the separate new encoded data markings within a single generated image of the at least one generated image; and in response to an indication that multiple new encoded data markings are not permitted to be included within the single generated image, generate each separate new encoded data marking within a separate generated image of the at least one generated image.

10. The decoding device of claim 1, wherein:

the scan image includes a second encoded data marking in addition to the first encoded data marking; and the processor is configured to perform further pre-processing operations comprising:

decode the second encoded data marking within the scan image to retrieve second data encoded in the second data marking;

retrieve stored configuration data that includes an indication of whether multiple new encoded data markings are permitted to be included within a single generated image of the at least one generated image;

in response to an indication that multiple new encoded data markings are permitted to be included within a single generated image, encode the first data in a first new data marking of the at least one new data marking within the single generated image of the at least one generated image, and encode the second data in a second new data marking of the at least one new data marking within the single generated image; and in response to an indication that multiple new encoded data markings are not permitted to be included within the single generated image, encode the first data in the first new data marking within a first generated image of the at least one generated image, and encode the second data in the second new data marking within a second generated image of the at least one generated image.

11. A method comprising:

in executing, by a processor of a decoding device, instructions of at least one executable routine of a scan engine pipeline of the decoding device, performing pre-processing operations comprising:

decoding, by the processor, a first encoded data marking within a scan image captured by a scan engine of the decoding device to retrieve first data encoded in the first encoded data marking; and encoding, by the processor, the first data in at least one new encoded data marking within at least one generated image;

in executing, by the processor, instructions of the at least one executable routine of the scan engine pipeline, providing the at least one generated image to at least one executable routine of a camera pipeline of the decoding device through a first camera driver interface of a first link formed between the scan engine pipeline and the camera pipeline, wherein characteristics of the first camera driver interface mimic characteristics of a second camera driver interface of a camera driver;

in executing, by the processor, instructions of at least one executable routine of the camera pipeline, relaying the at least one generated image to a camera scan application of the decoding device through a camera application programming interface (API), wherein the camera scan application is configured to use a camera through the camera API; and in executing, by the processor, instructions of the camera scan application, decoding the at least one new encoded data marking within the at least one generated image to retrieve the first data.

12. The method of claim 11, further comprising, in response to commencement of execution of instructions of the camera scan application by the processor, performing operations comprising:

retrieving, by the processor, stored configuration data that includes an indication of whether the camera scan application is associated with the camera or the scan engine; and in response to the camera scan application being indicated as being associated with the scan engine, providing, by the processor, a command to an aiming component associated with the scan engine to project a visual aiming guide onto a surface of an object within a field of view (FOV) of the scan engine.

13. The method of claim 12, wherein:

the at least one executable routine of the scan engine pipeline comprises a scanner service;

the at least one executable routine of the camera pipeline comprises a camera service that provides the camera API to the camera scan application;

the scanner service, the camera service and the camera scan application are executed by the processor within an architecture of an operating system; and providing the command to the aiming component associated with the scan engine comprises performing operations comprising:

using, by the processor, a registration process of the operating system to form a second link between the scanner service and the camera service;

relaying, by the processor, the command from the camera service, and to the scanner service; and within the scan engine pipeline, relaying, by the processor, the command through the scan engine pipeline from the scanner service, and to the aiming component.

14. The method of claim 11, wherein:

the at least one executable routine of the scan engine pipeline comprises a virtual camera HAL configured to provide the first camera driver interface;

the at least one executable routine of the camera pipeline comprises a camera HAL configured to communicate with the camera driver through the second camera driver interface;

the virtual camera HAL, the camera HAL and the camera scan application are executed by the processor within an architecture of an operating system; and providing the at least one generated image to the at least one executable routine of the camera pipeline comprises performing operations comprising:

using, by the processor, a registration process of the operating system to form the first link between the virtual camera HAL and the camera HAL; and relaying, by the processor, the at least one generated image from the virtual camera HAL, and to the camera HAL, with the characteristics of the first camera driver interface to present the scan engine to the camera HAL as if the scan engine is the camera.

15. The method of claim 14, wherein:

the at least one executable routine of the camera pipeline comprises the camera driver, wherein the camera driver is configured to provide the second camera driver interface; and the method further comprises, in response to commencement of execution of instructions of the camera scan application by the processor, performing operations comprising:

retrieving, by the processor, stored configuration data that includes an indication of whether the camera scan application is associated with the camera or the scan engine;

conditioning, by the processor, communications between the camera HAL and the virtual camera HAL through the first camera driver interface, and the performance of at least the pre-processing operations on whether the camera scan application is indicated in the stored configuration data as being associated with scan engine; and conditioning, by the processor, communications between the camera HAL and the camera driver through the second camera driver interface on whether the camera scan application is indicated in the stored configuration data as being associated with the camera.

16. The method of claim 11, wherein:

the scan engine comprises a skew sensor configured to detect a degree of skew of a plane of a surface of an object that carries the first encoded data marking relative to a plane of the scan engine;

the at least one executable routine of the scan engine pipeline comprises a skew component configured to mitigate the degree of skew; and the method further comprises performing further pre-processing operations comprising using, by the processor, the indication of the degree of skew to mitigate the degree of skew of the first encoded data marking to generate a rectified image of the first encoded data marking prior to the decoding of the first encoded data marking.

17. The method of claim 11, wherein:

the at least one executable routine of the scan engine pipeline comprises a repair component configured to repair damage to, or obscuring of, the first encoded data marking;

the first encoded data marking is damaged or obscured such that a portion of the first encoded data marking is not visible; and the method further comprises performing a further pre-processing operation comprising repairing, by the processor, the first encoded data marking to make the portion of the first encoded data marking visible to improve accuracy in decoding the first encoded data marking.

18. The method of claim 11, wherein:

the first encoded data marking and the at least one new encoded data marking employ differing formats for the first data;

the generation of the at least one new encoded data marking comprises a conversion of the first data from a first format in which the first data is encoded in the first encoded data marking, and to a second format in which the first data is encoded in the at least one new encoded data marking; and a difference between the first format and the second format comprises at least one of:

a bit width;

an ordering of bytes;

a delimiter;

a prefix; or a suffix.

19. The method of claim 18, wherein:

the first format is able to encode more data bits than and the second format;

the first data comprises a quantity of data bits that enables the first data to be encoded entirely within a maximum bit quantity of the first format of the first encoded data marking;

the first data comprises a quantity of data bits that does not enable the first data to be encoded entirely within a maximum bit quantity of the second format of a single encoded data marking of the at least one now encoded data marking; and the method further comprises performing further pre-processing operations comprising:

comparing, by the processor, the quantity of data bits of the first data to the maximum bit quantity of the second format;

in response to the quantity of data bits of the first data exceeding the maximum bit quantity of the second format, splitting, by the processor, the first data into multiple portions, and encoding, by the processor, each portion of the multiple portions within a separate new encoded data marking of the at least one new encoded data marking;

retrieving, by the processor, stored configuration data that includes an indication of whether multiple new encoded data markings are permitted to be included within a single generated image of the at least one generated image;

in response to an indication that multiple new encoded data markings are permitted to be included within a single generated image, generating, by the processor, multiple ones of the separate new encoded data markings within a single generated image of the at least one generated image; and in response to an indication that multiple new encoded data markings are not permitted to be included within the single generated image, generating, by the processor, each separate now encoded data marking within a separate generated image of the at least one generated image.

20. The method of claim 11, wherein:

the scan image includes a second encoded data marking in addition to the first encoded data marking; and the method further comprises performing further pre-processing operations comprising:

decoding, by the processor, the second encoded data marking within the scan image to retrieve second data encoded in the second data marking;

retrieving, by the processor, stored configuration data that includes an indication of whether multiple new encoded data markings are permitted to be included within a single generated image of the at least one generated image;

in response to an indication that multiple new encoded data markings are permitted to be included within a single generated image, encoding, by the processor, the first data in a first new data marking of the at least one new data marking within the single generated image of the at least one generated image, and encoding, by the processor, the second data in a second new data marking of the at least one new data marking within the single generated image; and in response to an indication that multiple new encoded data markings are not permitted to be included within the single generated image, encoding, by the processor, the first data in the first new data marking within a first generated image of the at least one generated image, and encoding, by the processor, the second data in the second new data marking within a second generated image of the at least one generated image.

* * * * *